(12) United States Patent
Bukesov et al.

(10) Patent No.: US 10,365,407 B2
(45) Date of Patent: Jul. 30, 2019

(54) OPTICALLY EXCITED PHOSPHOR DISPLAY SCREENS HAVING COLORING FILTERING PIGMENTS EMBEDDED IN PHOSPHOR MIXTURES

(71) Applicant: Prysm, Inc., San Jose, CA (US)

(72) Inventors: Sergey A. Bukesov, Acton, MA (US); Louis S. Stuhl, Concord, MA (US)

(73) Assignee: PRYSM, INC., San Jose, CA (US)

( * ) Notice: Subject to any disclaimer, the term of this patent is extended or adjusted under 35 U.S.C. 154(b) by 474 days.

(21) Appl. No.: 14/866,692

(22) Filed: Sep. 25, 2015

(65) Prior Publication Data

US 2016/0146433 A1 May 26, 2016

Related U.S. Application Data

(60) Provisional application No. 62/055,641, filed on Sep. 25, 2014.

(51) Int. Cl.
| | |
|---|---|
| *G02B 1/10* | (2015.01) |
| *G03B 21/20* | (2006.01) |
| *H04N 9/31* | (2006.01) |
| *G02B 26/10* | (2006.01) |
| *G02B 26/12* | (2006.01) |
| *G03B 21/60* | (2014.01) |
| *G02F 2/00* | (2006.01) |

(52) U.S. Cl.
CPC .............. *G02B 1/10* (2013.01); *G02B 26/105* (2013.01); *G02B 26/121* (2013.01); *G02B 26/123* (2013.01); *G02F 2/00* (2013.01); *G03B 21/60* (2013.01); *H04N 9/3129* (2013.01); *H04N 9/3158* (2013.01); *H04N 9/3164* (2013.01); *G02B 26/124* (2013.01); *G03B 21/204* (2013.01)

(58) Field of Classification Search
CPC ....... G03B 21/56; G03B 21/567; G03B 21/60
USPC ................... 359/443, 452–453, 460; 345/32
See application file for complete search history.

(56) References Cited

U.S. PATENT DOCUMENTS

| | | | | |
|---|---|---|---|---|
| 4,175,143 A | * | 11/1979 | Speigel ................ | C09K 11/025 427/220 |
| 4,392,077 A | * | 7/1983 | Libman ................. | H01J 29/185 313/474 |
| 7,884,816 B2 | * | 2/2011 | Burroughs ........... | G02B 26/101 345/213 |
| 7,994,702 B2 | * | 8/2011 | Bukesov ............... | C09K 11/08 313/498 |
| 8,778,224 B2 | * | 7/2014 | Bae ....................... | C09B 69/008 136/257 |
| 9,121,577 B2 | * | 9/2015 | Hajjar ....................... | F21V 9/10 |
| 2008/0203901 A1 | * | 8/2008 | Bukesov ............... | C09K 11/02 313/503 |
| 2012/0218417 A1 | * | 8/2012 | Bilger ................... | G03B 21/567 348/164 |

* cited by examiner

*Primary Examiner* — Christopher E Mahoney
(74) *Attorney, Agent, or Firm* — Perkins Coie LLP

(57) ABSTRACT

Techniques and optically excited light-emitting devices based on phosphors are provided to use phosphor materials which absorb excitation light to emit visible light and include a composite phosphor material including two or more different transition metal compounds that, under optical excitation of the excitation light, emit visible light at spectrally close but different spectral wavelengths or bands that spectrally overlap to produce a desired color.

49 Claims, 26 Drawing Sheets

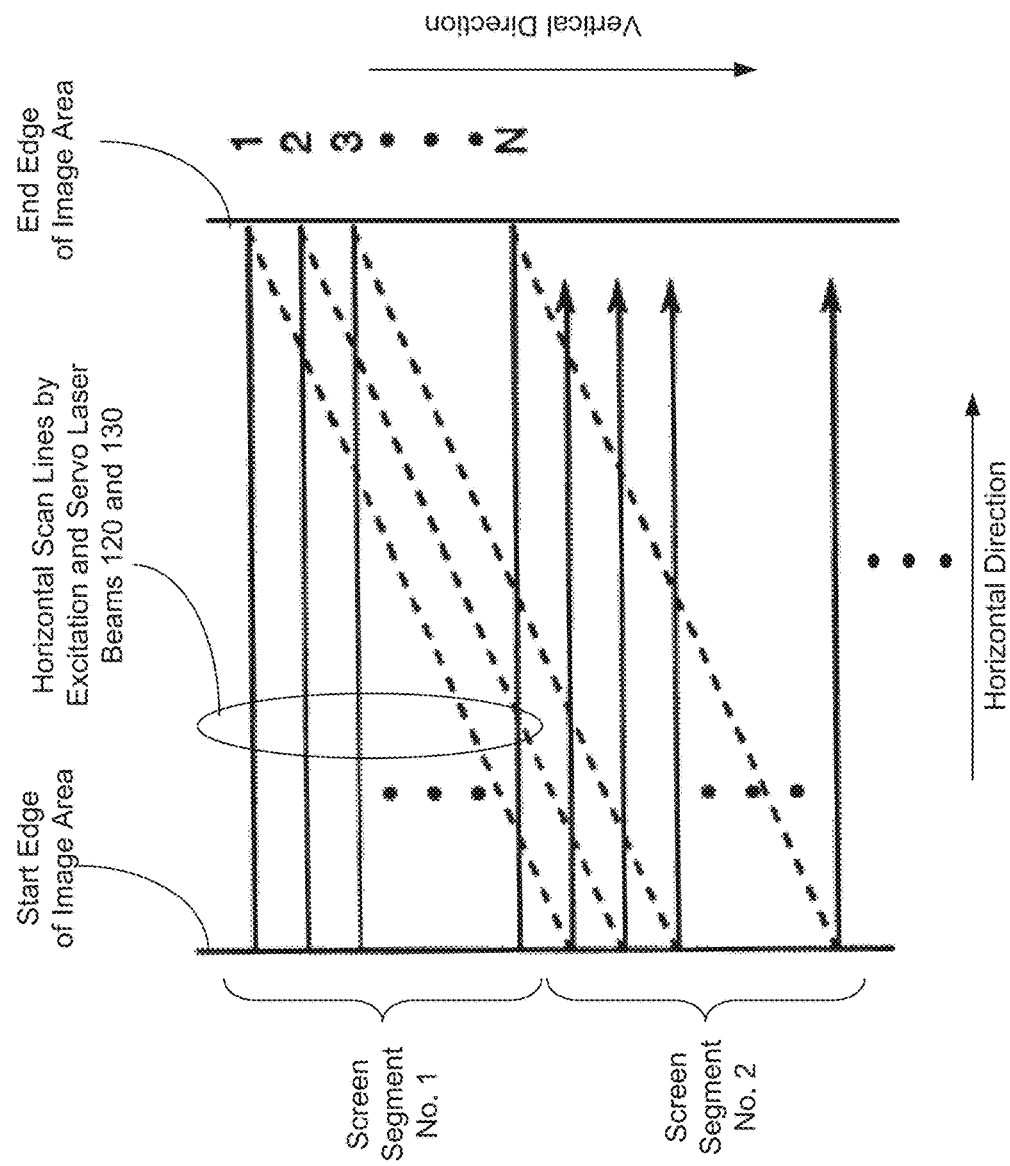

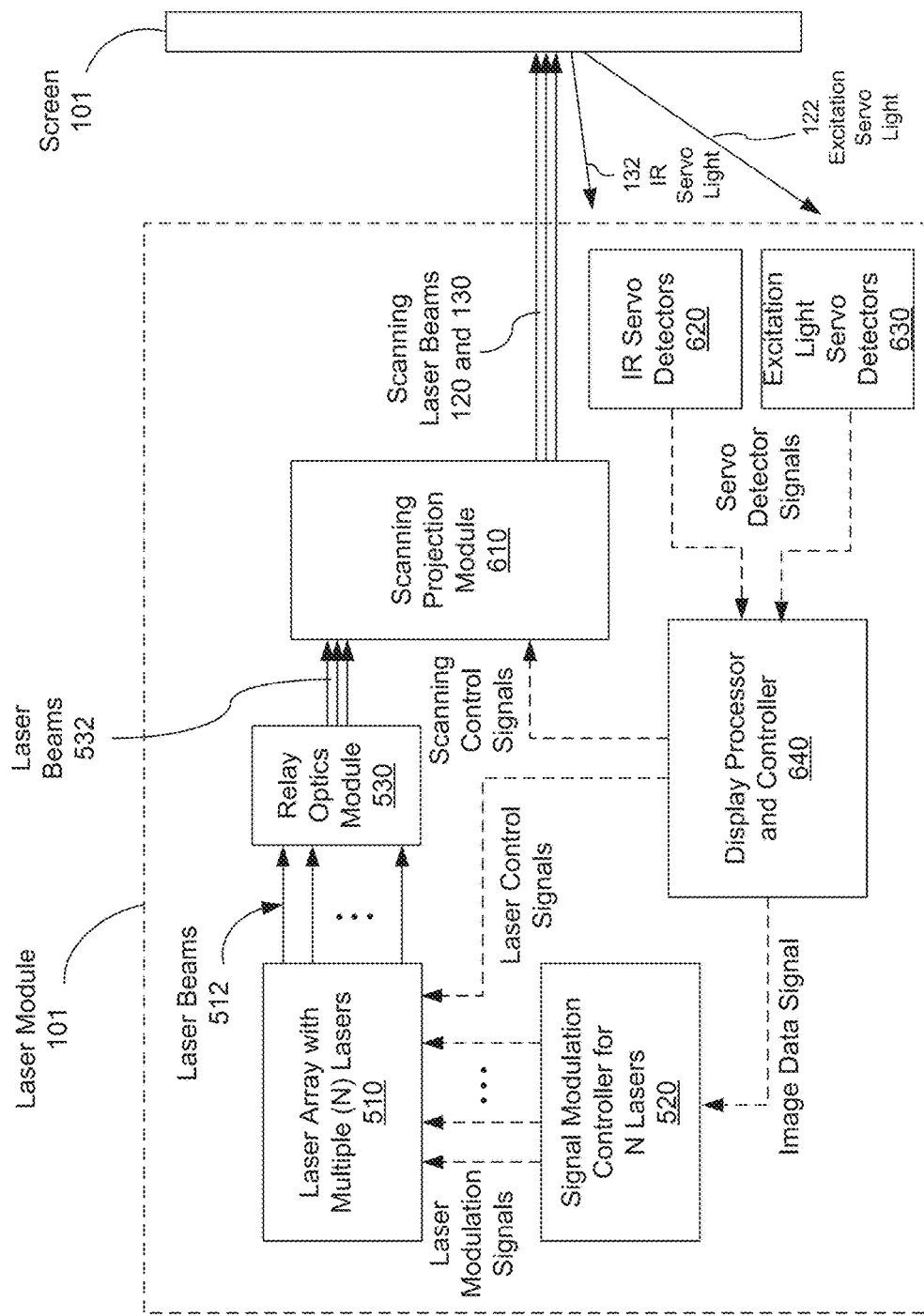

Chemical composition: modified alkaline earth silicon nitride: Eu

3. Composition/Information on Ingredients 3.1 Chemical characterization (substance)

Molecular formula: product is modified $(Ba,Ca,Sr,Eu)_2Si_5N_{8-2x}O_xC_x$

| CAS-No. | EINECS-No. | Molecular formula | content (mass-%) |
|---|---|---|---|
| 12033-82-8 | | $Sr_3N_2$ | $0 \leq a < 46$ |
| 12047-79-9 | | $Ba_3N_2$ | $0 \leq b < 56$ |
| 12013-82-0 | | $Ca_3N_2$ | $0 \leq c < 30$ |
| 12033-60-2 | EC 234-787-9 | $Si_3N_4$ | $40 < d < 70$ |
| 12020-60-9 | | EuO | $0 < e < 38$ |
| 409-21-2 | EC 206-991-8 | SiC | $0 < x \leq 12$ |

FIG. 12

Chemical composition (Sr,Ba,Ca)$_2$SiO$_4$:Eu

General
Name: (Barium, Strontium, Calcium) orthosilicate, doped with Europium
Formula: (Ba,Sr,Ca)$_2$SiO$_4$:Eu
Application: LPD, conversion phosphor in LEDs and fluorescent lamps

Optical properties:
luminescence color: orange
Peak wavelenght: 610 nm
CIE chromaticity coordinates: x=0,571   y=0,428   ($\lambda_{exc.}$ = 465nm)
(typical value; adjustable on demand)

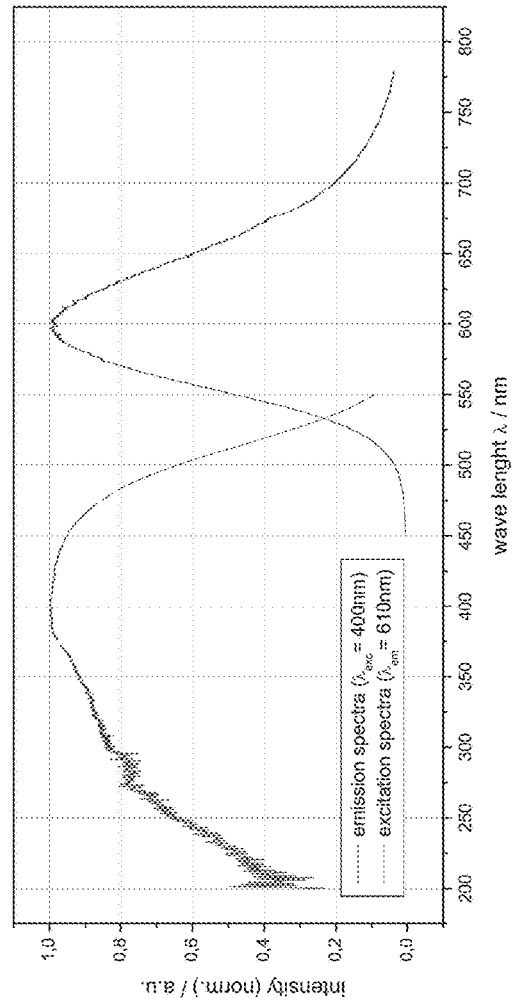

FIG. 13

Chemical composition (Sr,Ba,Ca)$_2$SiO$_4$:Eu

General
Name: (Barium, Strontium, Calcium) orthosilicate, doped with Europium
Formula: (Ba,Sr,Ca)$_2$SiO$_4$:Eu
Application: LPD, conversion phosphor in LEDs and fluorescent lamps

Optical properties:
luminescence color: green
Peak wavelenght: 525 nm
CIE chromaticity coordinates: x=0,270   y=0,630   ($\lambda_{exc.}$ = 465nm)
(typical value; adjustable on demand)

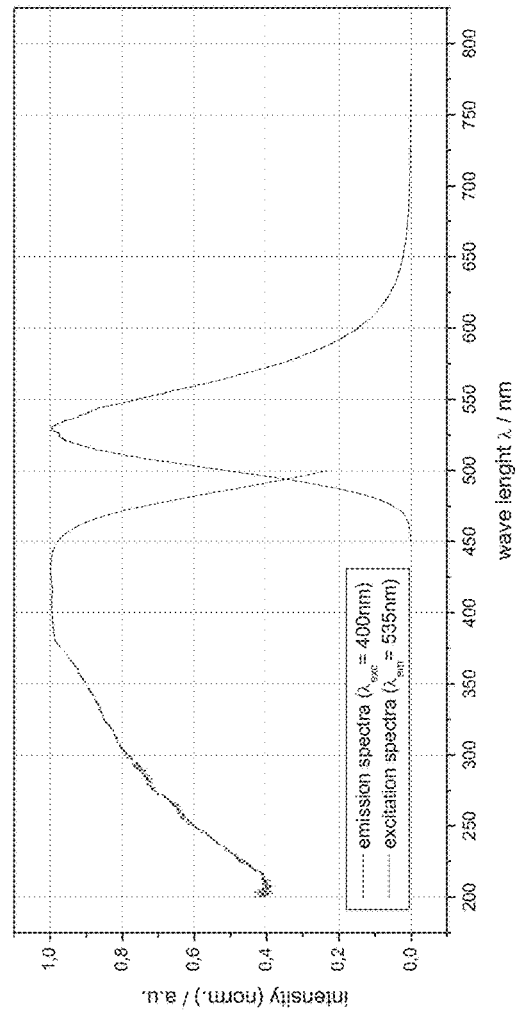

Chemical composition: $Sr_3MgSi_2O_8$:Eu

General
Name: alkaline earth silicate, doped with Europium
Formula: $(Ba,Sr,Ca)_3MgSi_2O_8$:Eu
Application: LPD, conversion phosphor in LEDs and fluorescent lamps

Optical properties:
luminescence color: blue
Peak wavelenght: 460 nm
CIE chromaticity coordinates: x=0,141, y=0,077 ($\lambda_{exc.}$ = 405nm)
(typical value, adjustable on demand)

Green or Yellow Pigment

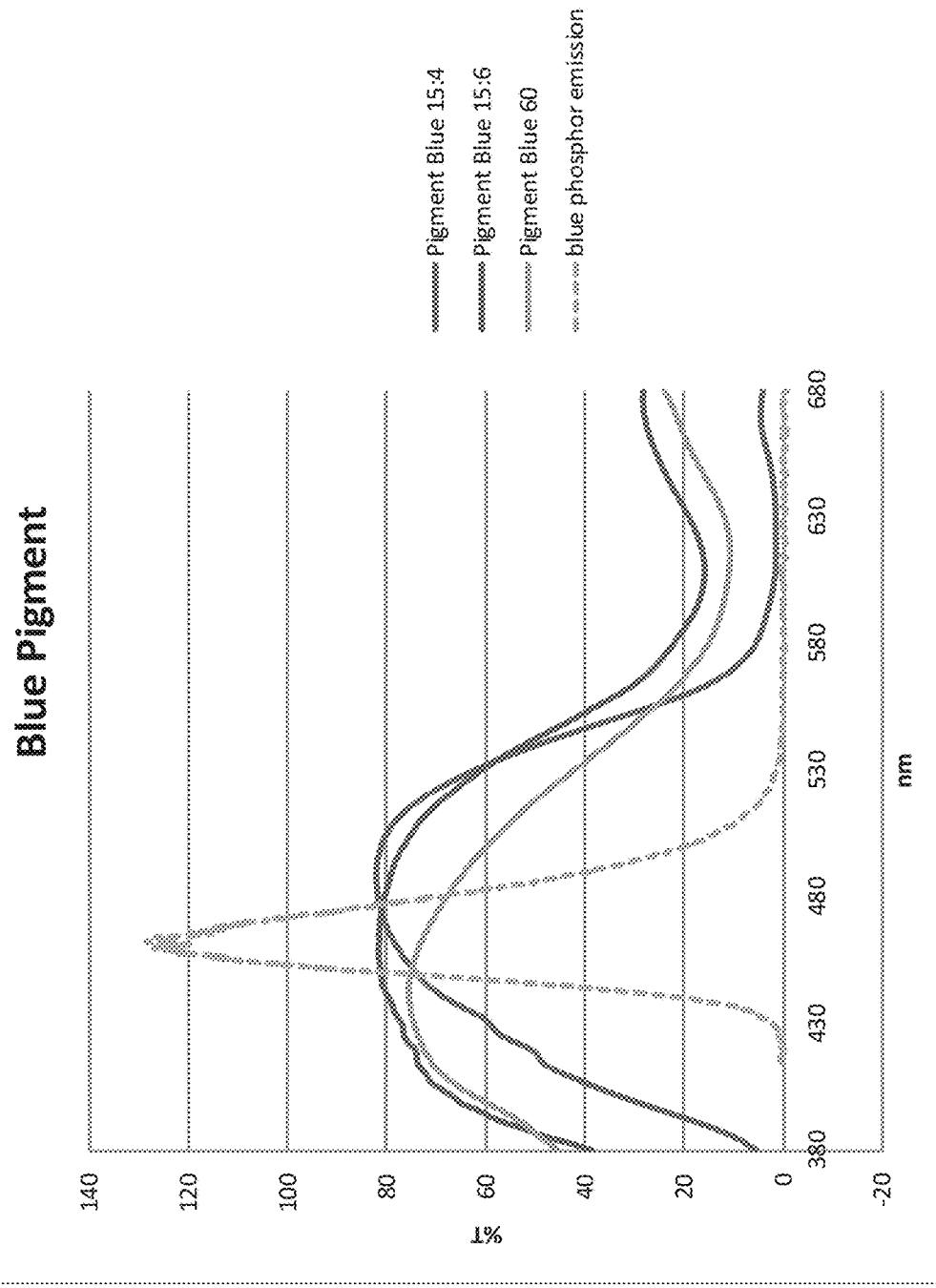

OPTICALLY EXCITED PHOSPHOR DISPLAY SCREENS HAVING COLORING FILTERING PIGMENTS EMBEDDED IN PHOSPHOR MIXTURES

PRIORITY CLAIM AND RELATED PATENT APPLICATION

This patent document claims the benefits and priority of U.S. Provisional Patent Application No. 62/055,641 entitled "OPTICALLY EXCITED PHOSPHOR DISPLAY SCREENS HAVING COLORING FILTERING PIGMENTS EMBEDDED IN PHOSPHOR MIXTURE" and filed Sep. 25, 2014, the content of which is incorporated by reference as part of this patent document.

BACKGROUND

This patent document relates to display screens having phosphor materials that emit visible light under optical excitation.

Various phosphor materials have been developed for emitting visible light by absorbing excitation light such as light at wavelengths in the violet spectral range (400-450 nm) and the ultra violet (UV) spectral ranges that are shorter than 400 nm. Phosphor materials can be used in display screens, light sources including LED devices and other applications that require generation of visible light.

SUMMARY

The disclosed technology includes light-emitting phosphor screens and applications in display devices or systems.

In one aspect, a display device is provided to include a display screen comprising a light-emitting layer including different phosphor regions that absorb excitation light to emit visible light of designated colors, respectively, wherein two adjacent phosphor regions emit light of two different colors, each phosphor region includes a phosphor mixture including a light-emitting phosphor material that emits light of a designated color in an emission spectral bandwidth, and one or more color filtering pigments embedded in the light-emitting phosphor material to transmit light of a respective designated color of the phosphor region while absorbing light of colors different from the respective designated color to reduce an output spectral bandwidth of the respective designated color produced by the phosphor region to be narrower than the emission spectral bandwidth. In implementations, the above device can include an optical module operable to produce the excitation light that scans across the display screen and carries optical pulses that carry information of different colors on a colored image to be generated by the emitted visible light of different colors by the display screen.

In another aspect, a method is provided for using light-emitting phosphor materials to produce colors to meet color gamut under the Digital Cinema Initiatives (DCI) in a phosphor display screen that is optically excited by UV light between 405 nm and 415 nm. This method includes including in a display screen a light-emitting layer that includes different phosphor regions that absorb excitation light to emit visible light of red, green and blue colors, respectively; configuring each phosphor region to include a phosphor mixture with a selected light-emitting phosphor material that emits light of a designated color of red, green or blue in an emission spectral bandwidth of the selected light-emitting phosphor material; further embedding one or more color filtering pigments in the selected light-emitting phosphor material to transmit light of a respective designated color of the phosphor region while absorbing light of colors different from the respective designated color to reduce an output spectral bandwidth of the respective designated color produced by the phosphor region to be narrower than the emission spectral bandwidth.

In another aspect, this patent document describes an optically excited light-emitting device based on phosphors that includes phosphor materials which absorb excitation light to emit visible light and include a composite phosphor material including two or more different metal compounds that, under optical excitation of the excitation light, emit visible light at spectrally close but different spectral wavelengths or bands that spectrally overlap to produce a desired color. In implementations, such a metal compound may be a compound of Ca, Sr, Ba, or Eu, among others.

In one implementation, a method for making a phosphor material for emitting visible light by absorbing excitation light is provided. This method includes selecting (1) one or more red(-deep red) emitting nitride) phosphors (e.g., nitride phosphors) and (2) one or more orange-red emitting phosphors (e.g., silicate phosphors). Each selected red phosphor and each selected orange-red phosphor emit visible light at spectrally close but different spectral wavelengths or bands that spectrally overlap to produce a desired color. This method includes mixing (1) the selected one or more red emitting phosphors and (2) the selected one or more orange-red emitting phosphors with a ratio with respect to one another to form a composite phosphor for producing light at the desired color.

In another implementation, a scanning beam display system based on phosphor material can include an excitation light source to produce one or more excitation beams of the same wavelength having optical pulses that carry image information; a beam scanning module to receive the one or more excitation beams and to scan the one or more excitation beams; and a light-emitting screen positioned to receive the one or more scanning excitation beams and including light-emitting phosphor materials which absorb light of the one or more excitation beams to emit visible light to produce images carried by the one or more scanning excitation beam, wherein the light-emitting phosphor materials include a composite phosphor material that is a mixture of one or more red emitting phosphors and one or more orange-red emitting phosphors and emits light of a desired color.

In yet another implementation, a scanning beam display system based on phosphor materials, can include an excitation light source to produce one or more excitation beams of the same wavelength having optical pulses that carry image information; a beam scanning module to receive the one or more excitation beams and to scan the one or more excitation beams; and a light-emitting screen positioned to receive the one or more scanning excitation beams and including light-emitting phosphor materials which absorb light of the one or more excitation beams to emit visible light to produce images carried by the one or more scanning excitation beam, wherein the light-emitting phosphor materials include (1) $(Ba,Sr,Ca)AlSiN_3:Eu$, or $(Ca,Sr,Ba) Si_2O_2N_2:Eu$, or $(Ca,Sr,Ba)_2Si_5N_8:Eu$ $(Ba,Ca,Sr,Eu)_2Si_5N_{8-2x}O_xC_x$, where $0 \leq Sr_3N_2 < 0.46$, $0 \leq Ba_3N_2 < 0.56$, $0 \leq Ca_3N_2 < 0.30$, $0 < Si_3N_4 < 0.7$, $0 < EuO < 0.38$, $0 < SiC \leq 0.12$ that emits red light between 625 nm and 635 nm, (2) $(Sr,Ba,Ca)_2SiO_4:Eu$ that emits green light green between 525 nm to 530 nm, and (3) $Sr_3MgSi_2O_8:Eu$ that emits blue between 455 nm and 465 nm.

BRIEF DESCRIPTION OF THE DRAWINGS

FIG. 4 shows one example for simultaneously scanning consecutive scan lines with multiple excitation laser beams and an invisible servo beam.

FIG. 7 shows one example of a scanning display system using a servo feedback control based on a scanning servo beam.

FIGS. 11, 12, 13 and 14 show optical properties of selected light-emitting phosphor materials.

FIG. 17A shows an example of the spectral properties of a blue pigment.

DETAILED DESCRIPTION

Figure 1A:
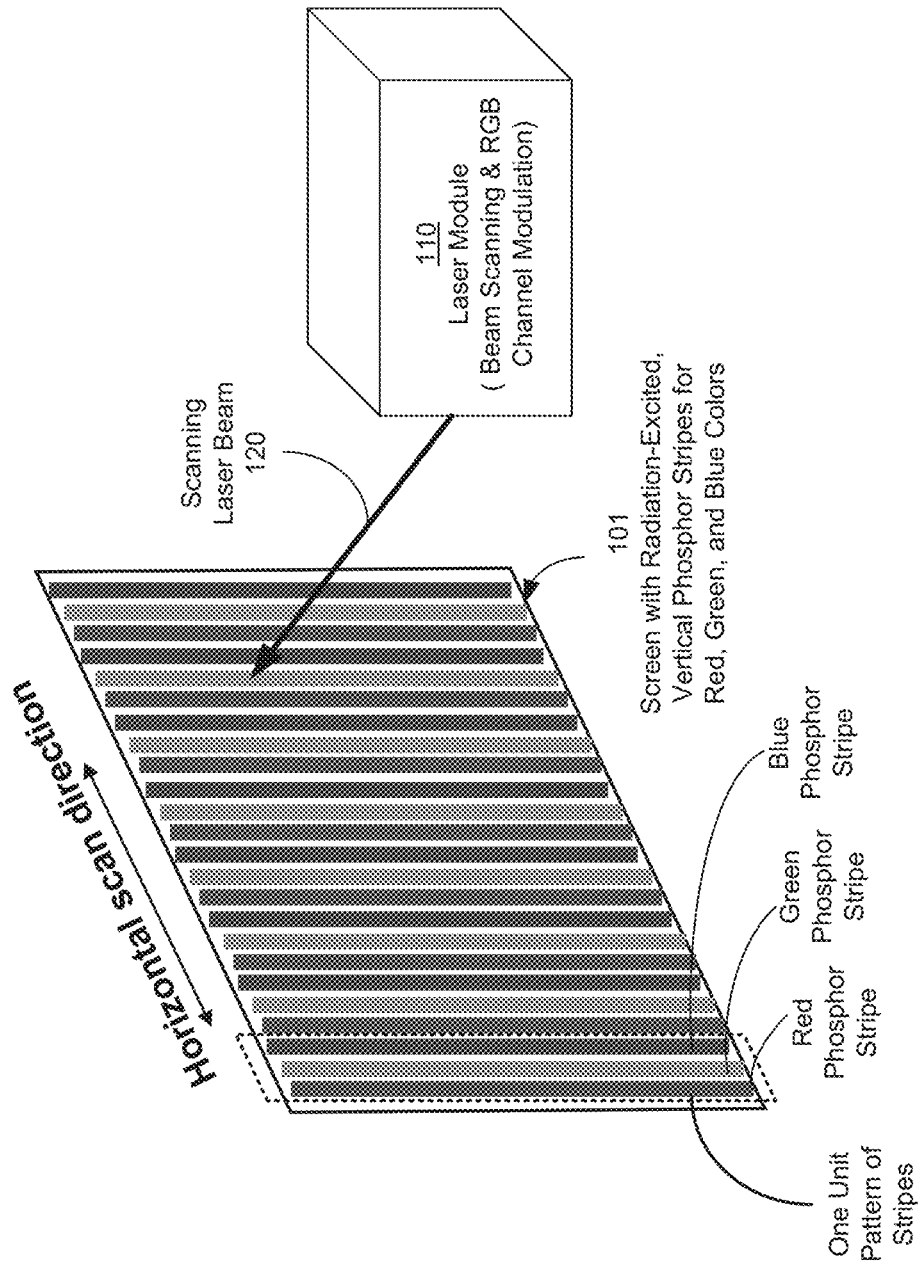
FIGS. 1A and 1B show examples of scanning laser display system having a light-emitting screen made of laser-excitable phosphor materials (e.g., phosphors) emitting colored lights under excitation of one or more scanning laser beams that carry the image information to be displayed.

Full-color display systems based on phosphor screens having different phosphor regions that can be optically excited to produce visible light of different colors can be configured to produce highly energy-efficient and large format display areas, vivid color quality, high display definition and flexible display configurations and surfaces including curved surfaces. Prysm Inc. in San Jose, Calif. develops, manufactures and markets such displays known as Laser Phosphor Display (LPD) systems. The LPD systems can be configured as video walls, curved large format displays or tiled video systems with customized geometries.

In various full-color phosphor screens including Prysm's LPD screens, a screen area is formed by having different phosphor regions arranged next to one another to emit different colors between two adjacent phosphor regions. Such different phosphor regions or stripes form a phosphor layer which can be manufactured in large formats by various techniques including printing processes. Such a phosphor screen can, for example, include parallel color-emitting phosphor stripes in the vertical direction across the screen and two adjacent phosphor stripes are made of different phosphor materials that emit light in different colors by absorbing the excitation light at a common excitation wavelength, e.g., a UV wavelength. In the illustrated examples in this document, a red phosphor stripe absorbs the excitation laser light to emit light in red, a green phosphor stripe absorbs the excitation laser light to emit light in green and a blue phosphor stripe absorbs the excitation laser light to emit light in blue. Adjacent three color phosphor stripes are in three different colors. One particular spatial color sequence of the stripes is a sequence of red, green and blue. Other color sequences or color sequences with more than three colors can also be used.

For high resolution displays, adjacent phosphor regions or stripes should be separated in their color emissions to produce a high display contrast and pure color output from each phosphor region or stripe. One way of achieving those goals is to use a separate layer of color filters over the phosphor layer so that a color filter over a corresponding phosphor region or stripe transmits the colored light emitted by that phosphor region or stripe and absorbs light of other colors emitted by adjacent phosphor regions or stripes. This selected absorption and transmission by the color filters can effectively reduce cross-talk between adjacent phosphor regions or stripes, reduce blurring or mixing of colors emitted by phosphor regions or stripes and to enhance the color purity and contrast of the display screens. However, this design of using separated phosphor layer and color filter layer adds structural complexity to display screens, causes various technical issues in fabrication such as additional structural layers, alignment between phosphor stripes of the phosphor layer and the corresponding color filters in the color filter layer, cause reliability issues due to the interfacing of different phosphor layer and color filter layer under different temperatures and aging trends, and increases costs to such screens in a highly competitive display markets.

The technology disclosed herein provides phosphor screen designs to achieve the above desired benefits of the separate color filter layer by a different approach: embedding optically selectively absorbing materials in the different phosphor regions or stripes so that the separated phosphor layer and color filter layer can be avoided. In each phosphor region or stripe for emitting a particular color of visible light, a pigment material which may be a single pigment or a mixture of pigments, disperses in, is embedded within and mixed with, the corresponding light-emitting phosphor material so that there is only one layer of the phosphor regions or stripes in the screen stack without a separate color filter layer. The one or more dispersed, embedded or mixed pigment materials in each phosphor region or stripe transmit light of the visible color emitted by that particular light-emitting phosphor material and absorb light of the colors emitted by adjacent phosphor regions or stripes and other phosphor regions or stripes that emit different colors. In a screen with phosphor regions or stripes for emitting red, green and blue colors, a red-emitting phosphor region or stripe includes a dispersed red pigment material that transmits the red light while absorbing green and blue; a green-emitting phosphor region or stripe includes a dispersed green pigment material that transmits the green light while absorbing red and blue; a blue-emitting phosphor region or stripe includes a dispersed blue pigment material that transmits the blue light while absorbing red and green. Notably, such pigments can be designed with proper compositions to engineer a desired color filtering spectral profile to produce a center wavelength for a particular color at a desired wavelength that may not be otherwise easily achieved by the emission of the corresponding light-emitting phosphor material for that color. To maximize the reception and absorption of the excitation light at a common excitation wavelength such a UV light, the pigments need to have good transmission to the UV excitation light. The disclosed technology in this document can be implemented to addresses those and other technical issues in various full-color phosphor screens including Prysm's LPD screens. Each pigment material is dispersed or suspended in the light-emitting phosphor material without being attached or coated on the light-emitting phosphor material. A binder material may be used as a binding material in which a light-emitting phosphor material and a pigment material are dispersed therein.

In implementations of the disclosed technology, for example, a display screen may include a light-emitting layer including different phosphor regions that absorb excitation light to emit visible light of designated colors, respectively. Two adjacent phosphor regions emit light of two different colors. Each phosphor region includes a phosphor mixture including a light-emitting phosphor material that emits light of a designated color in an emission spectral bandwidth, and one or more color filtering pigments dispersed and embedded in the light-emitting phosphor material to transmit light of a respective designated color of the phosphor region while absorbing light of colors different from the respective designated color to reduce an output spectral bandwidth of the respective designated color produced by the phosphor region to be narrower than the emission spectral bandwidth. This spectral bandwidth narrowing for the emission can be used to enhance the color purity and shape the primary colors for the color gamut of a particular display screen to achieve desired color reproduction in the display screen. With the proper selection of the phosphor materials and the corresponding pigments, such selected phosphor materials and the corresponding pigments can collectively produce desired color reproduction beyond the traditional phosphor materials, such as the wide colors under the DCI P3 specification for Digital Cinema Initiatives (DCI) for digital cinema projectors. Specific examples of display phosphor screens with certain phosphor materials and their corresponding embedded pigments in this document may be the first realization of wide colors under the DCI P3 specification using phosphor materials for scanning beam display systems.

A display screen with the above properties can be created by printing patterns of inks containing phosphor and pigment(s) onto a transparent substrate such as glass or a polymer film. The ink materials can be prepared using various suitable methods including those known in the art. The compositions and certain material properties of the ink materials can be tailored to a specific printing technology chosen for printing the patterns for the display screens, including, for example, the wide-bore inkjet printing, screen printing, or flexo printing, as well as the drying or curing capabilities of the printing machinery to be used. This tailoring can include adjustments to achieve the different viscosity levels and rheological behaviors suitable for certain printing methods. The ink materials can be formulated to solidify by physical drying or by a chemical curing process, e.g. catalyzed curing of a 2-part formulation or UV-photocuring of a photoinitiator-containing acrylate or epoxy based binder.

The ink materials can include ink binder components chosen to minimize or reduce degradation of the phosphor(s) or pigment(s) or themselves be degraded by exposure to the UV laser illumination or visible light emitted by the phosphor(s). For example, a UV-curable ink could be composed of acrylated monomers and oligomers combined with suitable photoinitiators. Typically, monomers and oligomers in the ink materials are aliphatic in nature (free of double or triple bonds other than those that are consumed in the photocuring process). Suitable acrylated monomers and oligomers are available commercially from many sources, including Allnex, IGM, Miwon, Sartomer, and Rahn. Suitable photoinitiators are available from BASF, Rahn, IGM, and others. The disclosed ink materials may also include additives commonly used in the printing industry such as wetting agents, leveling agents, defoamers, surface modification, or rheological additives can be used as needed as long as they do not absorb laser or visible light. Suitable examples of such materials can be obtained from Allnex, BASF, Byk Chemie, and Evonik. Examples include leveling agents such as Modaflow (Allnex) and Byk 350, defoamers such as Dynoadd F-705 (Dynea) and Tego Foamex N (Evonik), combined wetting and leveling agents such as Byk-UV 3510, and rheological additives such as Aerosil 200 (Evonik). Alternatively, a solvent-based, physically drying binder system could be chosen, for example a UV-stable acrylate such as Paraloid B-72 (Dow) or Elvacite 2009 (Lucite International). Suitable solvents include those commonly used in the printing industry such as ethylene glycol monobutyl ether acetate or cyclohexanone Water and aqueous/organic mixtures can only be used if the phosphor(s) are known to be completely stable to water.

Suitable phosphors for the display devices and LPDs in this document are difficult to find in commercially available phosphors that are designed for LEDs and other applications because such suitable phosphors for the disclosed devices in this document need to be optimized for use in inks in certain ways and require special attention to ink formulation to achieve printability, shelf stability, and the physical properties required for further handling. Depending on the specific binder formulation, a dispersing additive may be included to keep phosphor particles from clumping. Clumping (agglomeration) can cause excessive viscosity or settling problems and thus is undesired for the phosphor materials used in the disclosed technology of this document. The dispersing additives should be stable to the incident laser illumination. Different phosphors may require different dispersants. Exemplary dispersants include those from Byk, e.g. Disperbyk-111, 167, and 168, from Evonik, e.g. Tego Dispers 655 and 685, and from King Industries, e.g. K-Sperse A503. The phosphor should be added to the binder fluid after the dispersant is fully dissolved and should be dispersed at the highest shear force that does not damage the phosphor particles. Suitable dispersion techniques include 2 or 3-roll milling or high speed dispersing using a Cowles or similar dispersing blade. Sufficient dispersing energy should be applied to reduce the viscosity of the phosphor-containing fluid to a level suitable for the printing method chosen, otherwise printability and storage stability may be impaired.

One or pigments can be added to the ink materials depending on the exact formulation for implementing the disclosed technology. A pigment can be added to a specific ink material at one of several points in the mixing process, for example, either before or after the phosphor is added. For example, all the liquid components of the ink may be mixed together, the pigment(s) then mixed in, followed by the phosphor powder. Pigments may be added as dry powders, as chips predispersed in a soluble resin, or as premade liquid dispersions in a suitable solvent or monomer. If the pigments are added as dry powders, one or more suitable dispersants will probably need to be present in the fluid before they are added, otherwise excessive clumping and viscosity may result making the ink unprintable. Suitable dry pigments are available from many manufacturers, e.g. Clariant, Sun, Lansco, and BASF. Solid chip dispersions are available from e.g. Pan Technologies, and premade liquid dispersions can be prepared in a suitably equipped laboratory or purchased from e.g. Eagle Specialty Products, Pan Technologies, or Chromaflo Technologies. Suitable dispersants for dry pigment powders include ones from Lubrizol, Evonik, BASF, Byk, and many other companies. Specific examples include Solsperse 32000 and 35000 (Lubrizol), Disperbyk 163 and 2150 (Byk), and Efka 4330 (BASF).

Examples of scanning beam display systems for using the phosphors with embedded pigments described here use at least one scanning laser beam to excite color phosphor materials deposited on a screen to produce color images. The scanning laser beam is modulated to carry images in red, green and blue colors or in other visible colors and is controlled in such a way that the laser beam excites the color phosphor materials in red, green and blue colors with images in red, green and blue colors, respectively. Hence, the scanning laser beam carries the images but does not directly produce the visible light seen by a viewer. Instead, the color light-emitting phosphor materials on the screen absorb the energy of the scanning laser beam and emit visible light in red, green and blue or other colors to generate actual color images seen by the viewer. Emission of the visible colors on the screen to produce images provide the benefit of large viewing angles. Laser excitation of the phosphor materials using one or more laser beams with energy sufficient to cause the phosphor materials to emit light or to luminesce may use light in the violet spectral range and the ultra violet (UV) spectral range, e.g., wavelengths under 420 nm such as a wavelength around 405 nm or between 405 nm and 415 nm. In the examples described below, Violet or a UV laser beam is used as an example of the excitation light for a phosphor material or other fluorescent material and may be light at other wavelength.

Scanning beam display systems that use phosphor screens to emit light under optical excitation to produce images may be in various configurations. In one implementation, for example, three different color phosphors that are optically excitable by the UV laser beam to respectively produce light in red, green, and blue colors suitable for forming color images may be formed on the screen as pixel dots or repetitive red, green and blue phosphor stripes in parallel. The phosphor screens in such scanning beam systems generally operate at slightly elevated temperatures above the ambient temperature due to various features built into such systems, including, for example, the scanning nature of the systems, the modulation of the laser excitation beams where the laser power is modulated to be on and off to carry images while being power off during the majority of the operating period, and the screen design which is, unlike LED devices, expose the phosphor materials to the open air and spread the phosphor materials over large areas on the screens. The following sections provide technical details of examples of such scanning beam display systems that can benefit from the disclosed combinations of phosphor materials and embedded pigments.

Figure 1B:
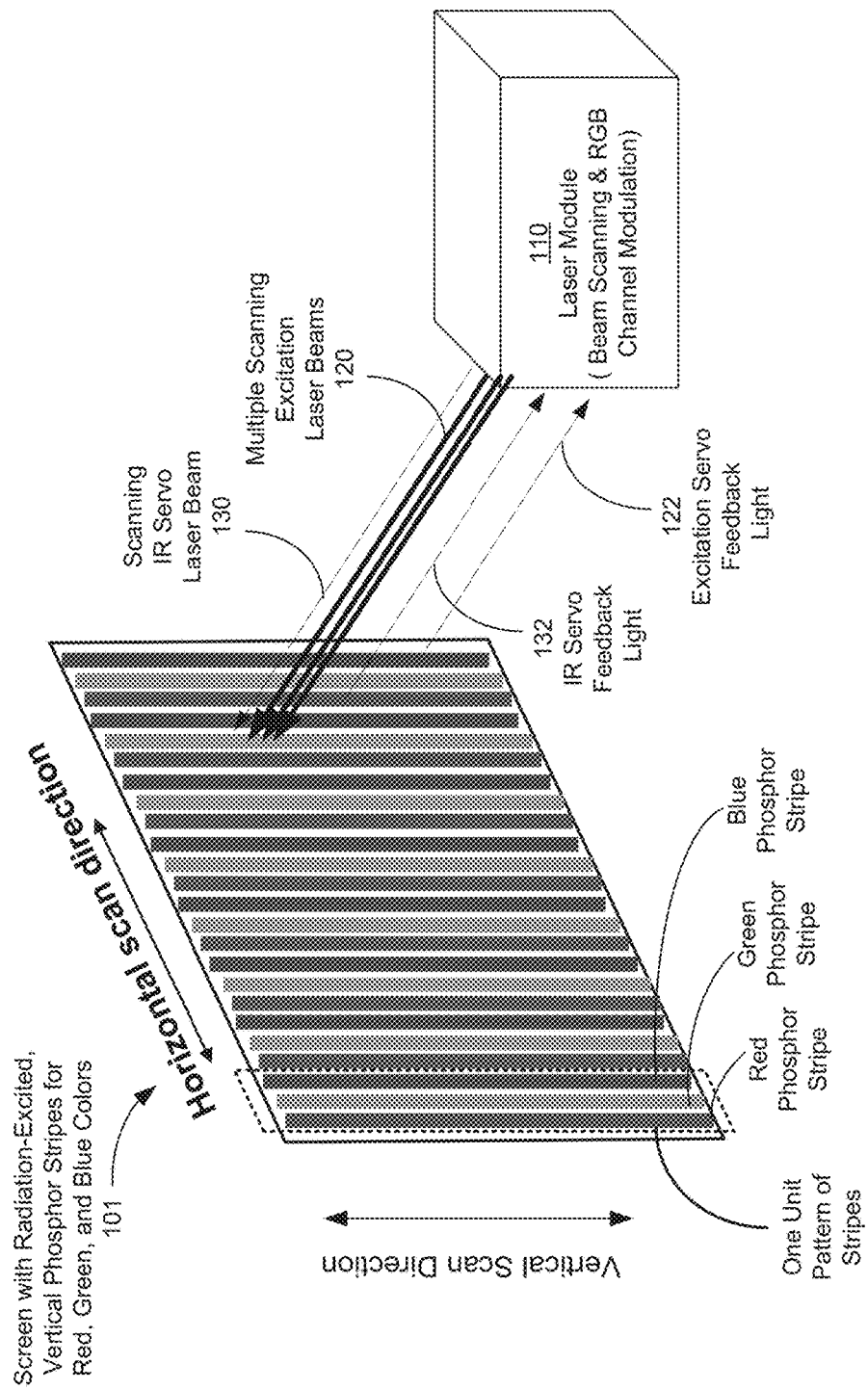

FIGS. 1A and 1B illustrate two examples of a laser-based display system using a screen having color phosphor stripes. Alternatively, color pixilated light-emitting areas may also be used to define the image pixels on the screen. Each system in FIGS. 1A and 1B includes a laser module 110 to produce and project at least one scanning laser beam 120 onto a screen 101. The screen 101 has parallel color phosphor stripes in the vertical direction and two adjacent phosphor stripes are made of different phosphor materials that emit light in different colors. In the illustrated example, red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1C as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range below 420 nm, e.g., between 405 nm and 415 nm, to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. FIG. 1A shows a single beam implementation where the laser module 110 produces a single excitation beam 120 to scan over the screen 101. FIG. 1B shows a bundle of multiple excitation beams 120 to scan over the screen 101 at the same time. Such display systems may be configured as rear scanning systems where the viewer and the laser module 110 are on the opposite sides of the screen 101. Alternatively, such display systems may be configured as front scanning systems where the viewer and laser module 110 are on the same side of the screen 101.

The screen 101 can be made to support large display format, e.g., with a screen dimension greater than 100 inches. Large display formats can also be constructed by using multiple such display systems in FIGS. 1A and 1B to stack the screens 101 as tiles to form a composite large screen or a video wall. Each screen 101 within the composite large screen is illuminate by its respective laser module 110. In both single screen implementation and multi-screen implementation, the total amounts of the phosphors for emitting the red, green and blue light are increased with the size of the final display format. Hence, the cost of the phosphors can impact the commercial deployment of such systems. The screen 101 may be a flat screen or a curved screen so that a video wall based on such screens 101 can have certain curved display surfaces. In addition, FIG. 1B also illustrates two examples of a feedback mechanism for providing optical alignment information of the excitation light on the screen 101 for controlling beam alignment on the screen 101.

Examples of implementations of various features, modules and components in the scanning laser display system in FIGS. 1A and 1B are described in PCT Patent Application No. PCT/US2007/004004 entitled "Servo-Assisted Scanning Beam Display Systems Using Fluorescent Screens" and filed on Feb. 15, 2007 (PCT Publication No. WO 2007/095329), PCT Patent Application No. PCT/US2007/068286 entitled "Phosphor Compositions for Scanning Beam Displays" and filed on May 4, 2007 (PCT Publication No. WO 2007/131195), PCT Patent Application No. PCT/US2007/68989 entitled "Multilayered Fluorescent Screens for Scanning Beam Display Systems" and filed on May 15, 2007 (PCT Publication No. WO 2007/134329), and PCT Patent Application No. PCT/US2006/041584 entitled "Optical Designs for Scanning Beam Display Systems Using Fluorescent Screens" and filed on Oct. 25, 2006 (PCT Publication No. WO 2007/050662). The disclosures of the above-referenced patent applications are incorporated by reference in their entirety as part of the specification of this application.

Figure 2A:
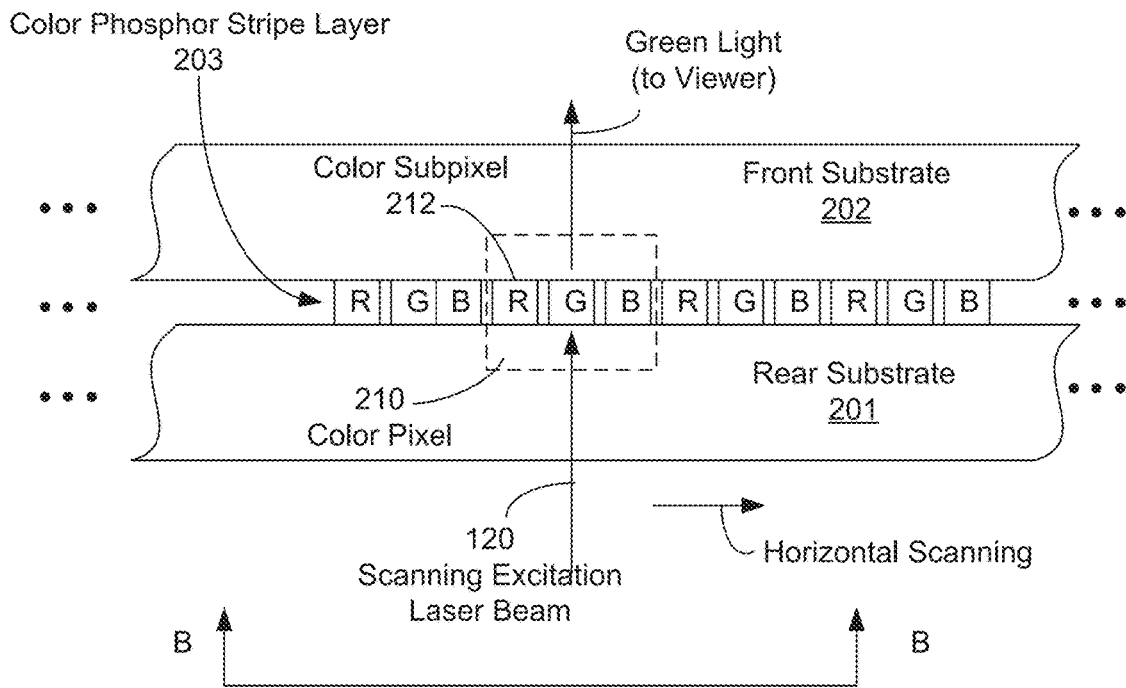
FIGS. 2A and 2B show one example screen structure with parallel light-emitting stripes and the structure of color pixels on the screen in FIG. 1C.

FIG. 2A shows an exemplary design of the screen 101 in FIGS. 1A and 1B. The screen 101 may include a rear substrate 201 which is transparent to the scanning laser beam 120 and faces the laser module 110 to receive the scanning laser beam 120. A second front substrate 202, is fixed relative to the rear substrate 201 and faces the viewer in a rear scanning configuration. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic panels. The rear substrate 201 can be a thin film layer and is configured to recycle the visible energy toward the viewer. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The relative alignment of the laser module 110 and the screen 101 can be monitored and controlled to ensure proper alignment between the laser beam 120 and each pixel position on the screen 101. In one implementation, the laser module 110 can be controlled to be fixed in position relative to the screen 101 so that the scanning of the beam 120 can be controlled in a predetermined manner to ensure proper alignment between the laser beam 120 and each pixel position on the screen 101.

Figure 2B:
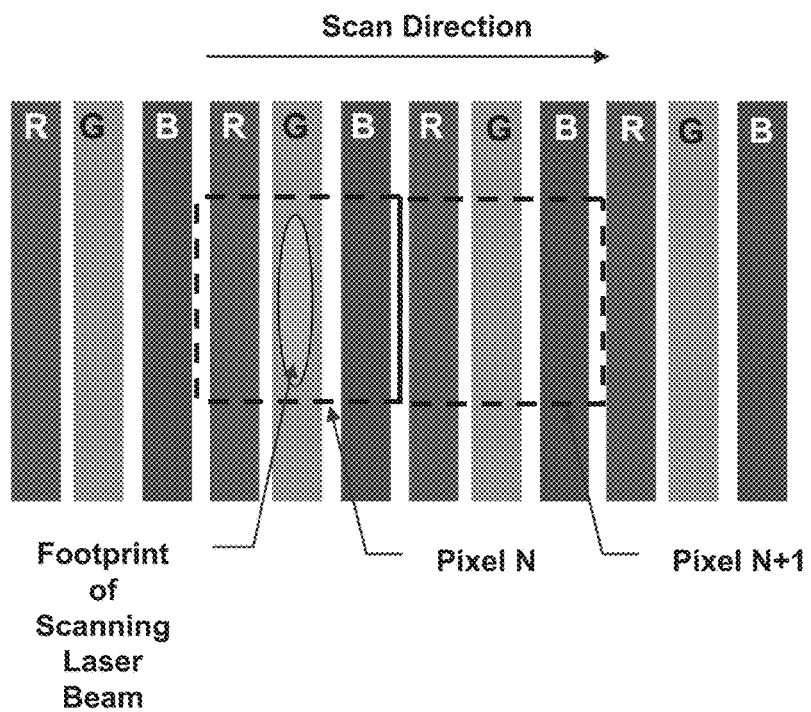

In FIG. 2A, the scanning laser beam 120 is directed at the green phosphor stripe within a pixel to produce green light for that pixel. FIG. 2B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a beam spread that is confined by and is smaller than the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multi-modes to ensure sufficient brightness of the screen.

Figure 3A:
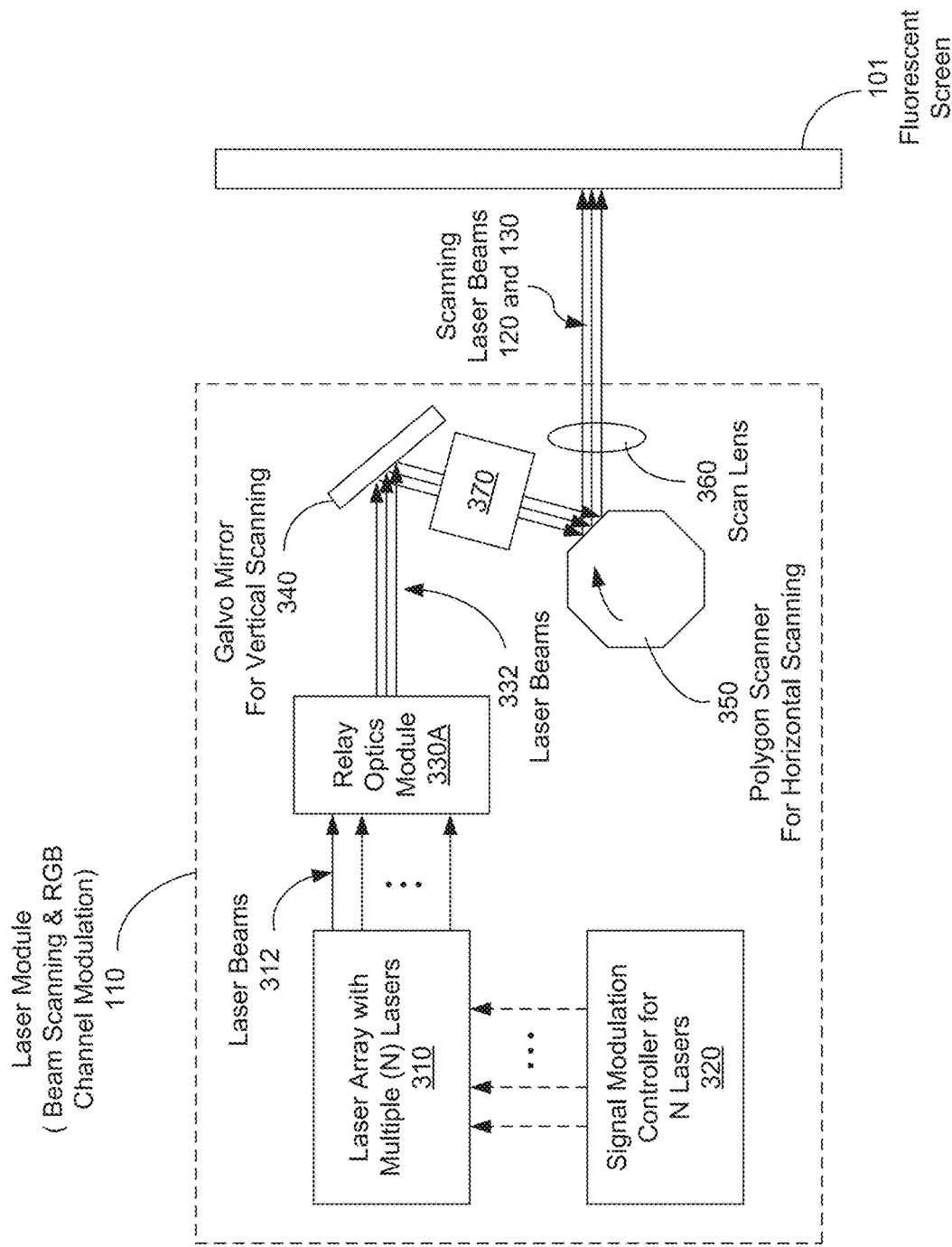
FIGS. 3A, 3B and 3C show example implementations of the scanning beam laser display system in FIG. 1B.

FIG. 3A shows an example implementation of the laser module 110. A laser array 310 with multiple lasers is used to generate multiple laser beams 312 to simultaneously scan the screen 101 for enhanced display brightness. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning can be achieved by using a scanning mirror 340 such as a galvo mirror for the vertical scanning and a multi-facet polygon scanner 350 for the horizontal scanning. A scan lens 360 can be used to project the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers. In the illustrated example, the laser beams are first directed to the galvo mirror 340 and then from the galvo mirror 340 to the polygon scanner 350. The output scanning beams 120 are then projected onto the screen 101. A relay optics module 330 is placed in the optical path of the laser beams 312 to modify the spatial property of the laser beams 312 and to produce a closely packed bundle of beams 332 for scanning by the galvo mirror 340 and the polygon scanner 350 as the scanning beams 120 projected onto the screen 101 to excite the phosphors and to generate the images by colored light emitted by the phosphors. A relay optics module 370 is inserted between the scanners 340 and 350 to image the reflective surface of the reflector in the vertical scanner 340 into a respective reflecting facet of the polygon scanner 350 in order to prevent beam walk across the thin facet of the polygon scanner 350 in the vertical direction.

Figure 3B:
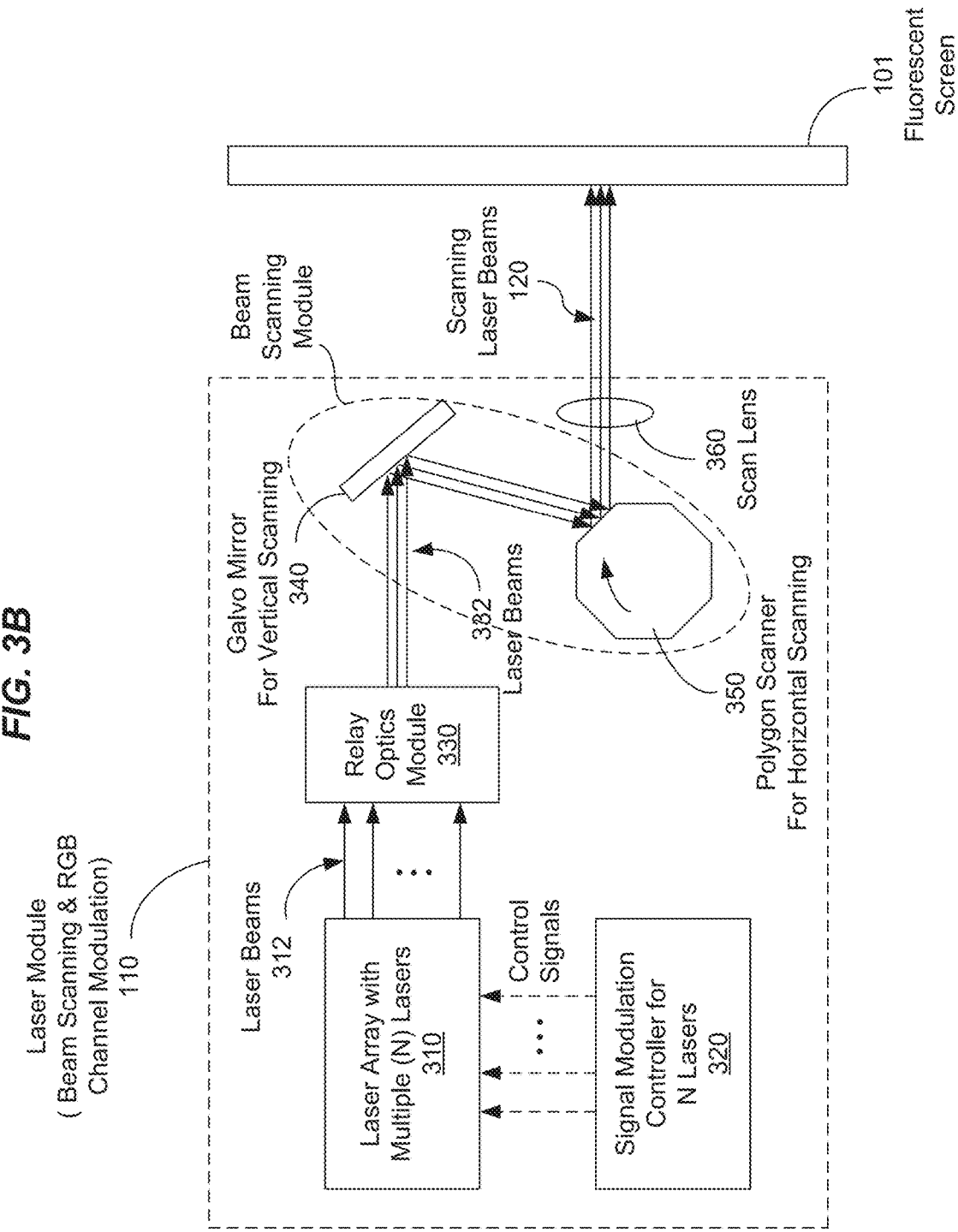

FIG. 3B shows another implementation without the relay optics module 370 in FIG. 3A.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 320. The beam scanning thus maps the time-domain coded image signals in the beams 120 onto the spatial pixels on the screen 101. For example, the modulated laser beams 120 can have each color pixel time equally divided into three sequential time slots for the three color subpixels for the three different color channels. The modulation of the beams 120 may use pulse modulation techniques to produce desired grey scales in each color, a proper color combination in each pixel, and desired image brightness.

In one implementation, the multiple beams 120 are directed onto the screen 101 at different and adjacent vertical positions with two adjacent beams being spaced from each other on the screen 101 by one horizontal line of the screen 101 along the vertical direction. For a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101.

In one implementation, at an angular position of the galvo mirror 340, the spinning of the polygon scanner 350 causes the beams 120 from N lasers in the laser array 310 to scan one screen segment of N adjacent horizontal lines on the screen 101. The galvo mirror 340 tilts linearly to change its tiling angle at a given rate along a vertical direction from the top towards the bottom during the scanning by the polygon until the entire screen 101 is scanned to produce a full screen display. At the end of the galvo vertical angular scan range, the galvo retraces to its top position and the cycle is repeated in synchronization with the refresh rate of the display.

In another implementation, for a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101. At a fixed angular position of the galvo mirror 340, the spinning of the polygon scanner 350 causes the beams 120 from N lasers in the laser array 310 to scan one screen segment of N adjacent horizontal lines on the screen 101. At the end of each horizontal scan over one screen segment, the galvo mirror 340 is adjusted to a different fixed angular position so that the vertical positions of all N beams 120 are adjusted to scan the next adjacent screen segment of N horizontal lines. This process iterates until the entire screen 101 is scanned to produce a full screen display.

In the above example of a scanning beam display system shown in FIG. 3A, the scan lens 360 is located downstream from the beam scanning devices 340 and 350 and focuses the one or more scanning excitation beams 120 onto the screen 101. This optical configuration is referred to as a "pre-objective" scanning system. In such a pre-objective design, a scanning beam directed into the scan lens 360 is scanned along two orthogonal directions. Therefore, the scan lens 360 is designed to focus the scanning beam onto the screen 101 along two orthogonal directions. In order to achieve the proper focusing in both orthogonal directions, the scan lens 360 can be complex and, often, are made of multiples lens elements. In one implementation, for example, the scan lens 360 can be a two-dimensional f-theta lens that is designed to have a linear relation between the location of the focal spot on the screen and the input scan angle (theta) when the input beam is scanned around each of two orthogonal axes perpendicular to the optic axis of the scan lens. The two-dimensional scan lens 360 such as a f-theta lens in the pre-objective configuration can exhibit optical distortions along the two orthogonal scanning directions which cause beam positions on the screen 101 to trace a curved line. The scan lens 360 can be designed with multiple lens elements to reduce the bow distortions and can be expensive to fabricate.

To avoid the above distortion issues associated with a two-dimensional scan lens in a pre-objective scanning beam system, a post-objective scanning beam display system can be implemented to replace the two-dimensional scan lens 360 with a simpler, less expensive 1-dimensional scan lens. U.S. patent application Ser. No. 11/742,014 entitled "POST-OBJECTIVE SCANNING BEAM SYSTEMS" and filed on Apr. 30, 2007 (U.S. Pat. No. 7,697,183) describes examples of post-objective scanning beam systems suitable for use with phosphor screens described in this application and is incorporated by reference as part of the specification of this application.

Figure 3C:
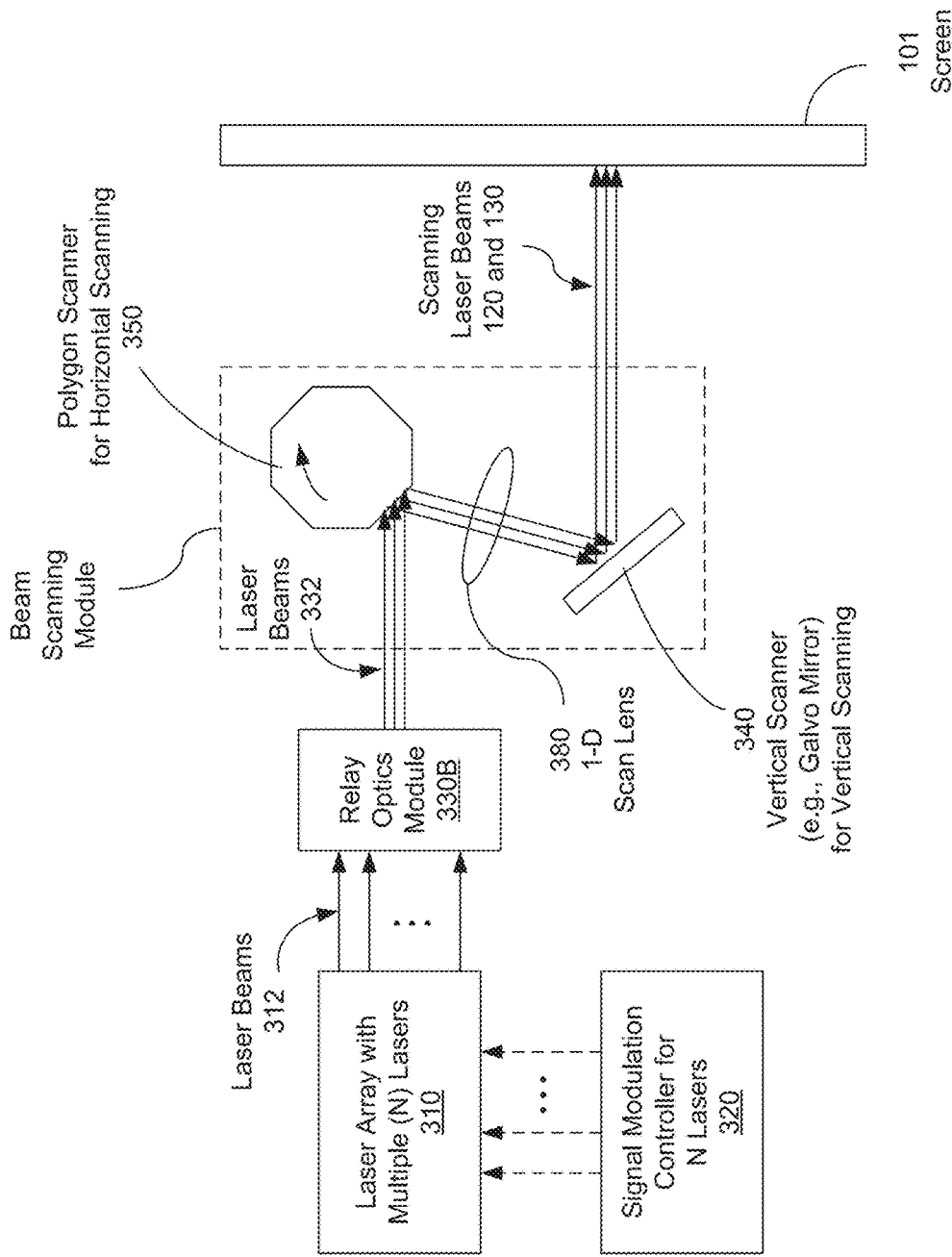

FIG. 3C shows an example implementation of a post-objective scanning beam display system based on the system design in FIGS. 1A and 1B. A laser array 310 with multiple lasers is used to generate multiple laser beams 312 to simultaneously scan a screen 101 for enhanced display brightness. A signal modulation controller 320 is provided to control and modulate the lasers in the laser array 310 so that the laser beams 312 are modulated to carry the image to be displayed on the screen 101. The beam scanning is based on a two-scanner design with a horizontal scanner such as a polygon scanner 350 and a vertical scanner such as a galvanometer scanner 340. Each of the different reflective facets of the polygon scanner 350 simultaneously scans N horizontal lines where N is the number of lasers. A relay optics module 330 reduces the spacing of laser beams 312 to form a compact set of laser beams 332 that spread within the facet dimension of the polygon scanner 350 for the horizontal scanning Downstream from the polygon scanner 350, there is a 1-D horizontal scan lens 380 followed by a vertical scanner 340 (e.g., a galvo mirror) that receives each horizontally scanned beam 332 from the polygon scanner 350 through the 1-D scan lens 380 and provides the vertical scan on each horizontally scanned beam 332 at the end of each horizontal scan prior to the next horizontal scan by the next facet of the polygon scanner 350. The vertical scanner 340 directs the 2-D scanning beams 390 to the screen 101.

Under this optical design of the horizontal and vertical scanning, the 1-D scan lens 380 is placed downstream from the polygon scanner 140 and upstream from the vertical scanner 340 to focus each horizontal scanned beam on the screen 101 and minimizes the horizontal bow distortion to displayed images on the screen 101 within an acceptable range, thus producing a visually "straight" horizontal scan line on the screen 101. Such a 1-D scan lens 380 capable of producing a straight horizontal scan line is relatively simpler and less expensive than a 2-D scan lens of similar performance. Downstream from the scan lens 380, the vertical scanner 340 is a flat reflector and simply reflects the beam to the screen 101 and scans vertically to place each horizontally scanned beam at different vertical positions on the screen 101 for scanning different horizontal lines. The dimension of the reflector on the vertical scanner 340 along the horizontal direction is sufficiently large to cover the spatial extent of each scanning beam coming from the polygon scanner 350 and the scan lens 380. The system in FIG. 3C is a post-objective design because the 1-D scan lens 380 is upstream from the vertical scanner 340. In this particular example, there is no lens or other focusing element downstream from the vertical scanner 340. Notably, in the post-objective system in FIG. 3C, the distance from the scan lens to a location on the screen 101 for a particular beam varies with the vertical scanning position of the vertical scanner 340. Therefore, when the 1-D scan lens 380 is designed to have a fixed focal distance along the straight horizontal line across the center of the elongated 1-D scan lens, the focal properties of each beam must change with the vertical scanning position of the vertical scanner 380 to maintain consistent beam focusing on the screen 101. In this regard, a dynamic focusing mechanism can be implemented to adjust convergence of the beam going into the 1-D scan lens 380 based on the vertical scanning position of the vertical scanner 340.

For example, in the optical path of the one or more laser beams from the lasers to the polygon scanner 350, a stationary lens and a dynamic refocus lens can be used as the dynamic focusing mechanism. Each beam is focused by the dynamic focus lens at a location upstream from the stationary lens. When the focal point of the lens coincides with the focal point of the lens, the output light from the lens is collimated. Depending on the direction and amount of the deviation between the focal points of the lenses, the output light from the collimator lens toward the polygon scanner 350 can be either divergent or convergent. Hence, as the relative positions of the two lenses along their optic axis are adjusted, the focus of the scanned light on the screen 101 can be adjusted. A refocusing lens actuator can be used to adjust the relative position between the lenses in response to a control signal. In this particular example, the refocusing lens actuator is used to adjust the convergence of the beam directed into the 1-D scan lens 380 along the optical path from the polygon scanner 350 in synchronization with the vertical scanning of the vertical scanner 340. The vertical scanner 340 in FIG. 3C scans at a much smaller rate than the scan rate of the first horizontal scanner 350 and thus a focusing variation caused by the vertical scanning on the screen 101 varies with time at the slower vertical scanning rate. This allows a focusing adjustment mechanism to be implemented in the system with the lower limit of a response speed at the slower vertical scanning rate rather than the high horizontal scanning rate.

The beams 120 on the screen 101 are located at different and adjacent vertical positions with two adjacent beams being spaced from each other on the screen 101 by one horizontal line of the screen 101 along the vertical direction. For a given position of the galvo mirror and a given position of the polygon scanner, the beams 120 may not be aligned with each other along the vertical direction on the screen 101 and may be at different positions on the screen 101 along the horizontal direction. The beams 120 can cover one portion of the screen 101.

When multiple scanning excitation laser beams 120 are present as shown in FIG. 1B, the multiple scanning excitation laser beams 120 can be scanned in certain ways. FIG. 4 illustrates simultaneous scanning of one screen segment with multiple scanning laser beams 120 at a time. Visually, the beams 120 behaves like a paint brush to "paint" one thick horizontal stroke across the screen 101 at a time to cover one screen segment between the start edge and the end edge of the image area of the screen 101 and then subsequently to "paint" another thick horizontal stroke to cover an adjacent vertically shifted screen segment. Assuming the laser array 310 has N=36 lasers, a 1080-line progressive scan of the screen 101 would require scanning 30 vertical screen segments for a full scan. Hence, this configuration in an effect divides the screen 101 along the vertical direction into multiple screen segments so that the N scanning beams scan one screen segment at a time with each scanning beam scanning only one line in the screen segment and different beams scanning different sequential lines in that screen segment. After one screen segment is scanned, the N scanning beams are moved at the same time to scan the next adjacent screen segment.

In the above design with multiple laser beams, each scanning laser beam 120 scans only a number of lines across the entire screen along the vertical direction that is equal to the number of screen segments. Hence, the polygon scanner 550 for the horizontal scanning can operate at slower speeds than scanning speeds required for a single beam design where the single beam scans every line of the entire screen. For a given number of total horizontal lines on the screen (e.g., 1080 lines in HDTV), the number of screen segments decreases as the number of the lasers increases. Hence, with 36 lasers, the galvo mirror and the polygon scanner scan 30 lines per frame while a total of 108 lines per frame are scanned when there are only 10 lasers. Therefore, the use of the multiple lasers can increase the image brightness which is approximately proportional to the number of lasers used, and, at the same time, can also advantageously reduce the speed of the scanning system.

Figure 5:
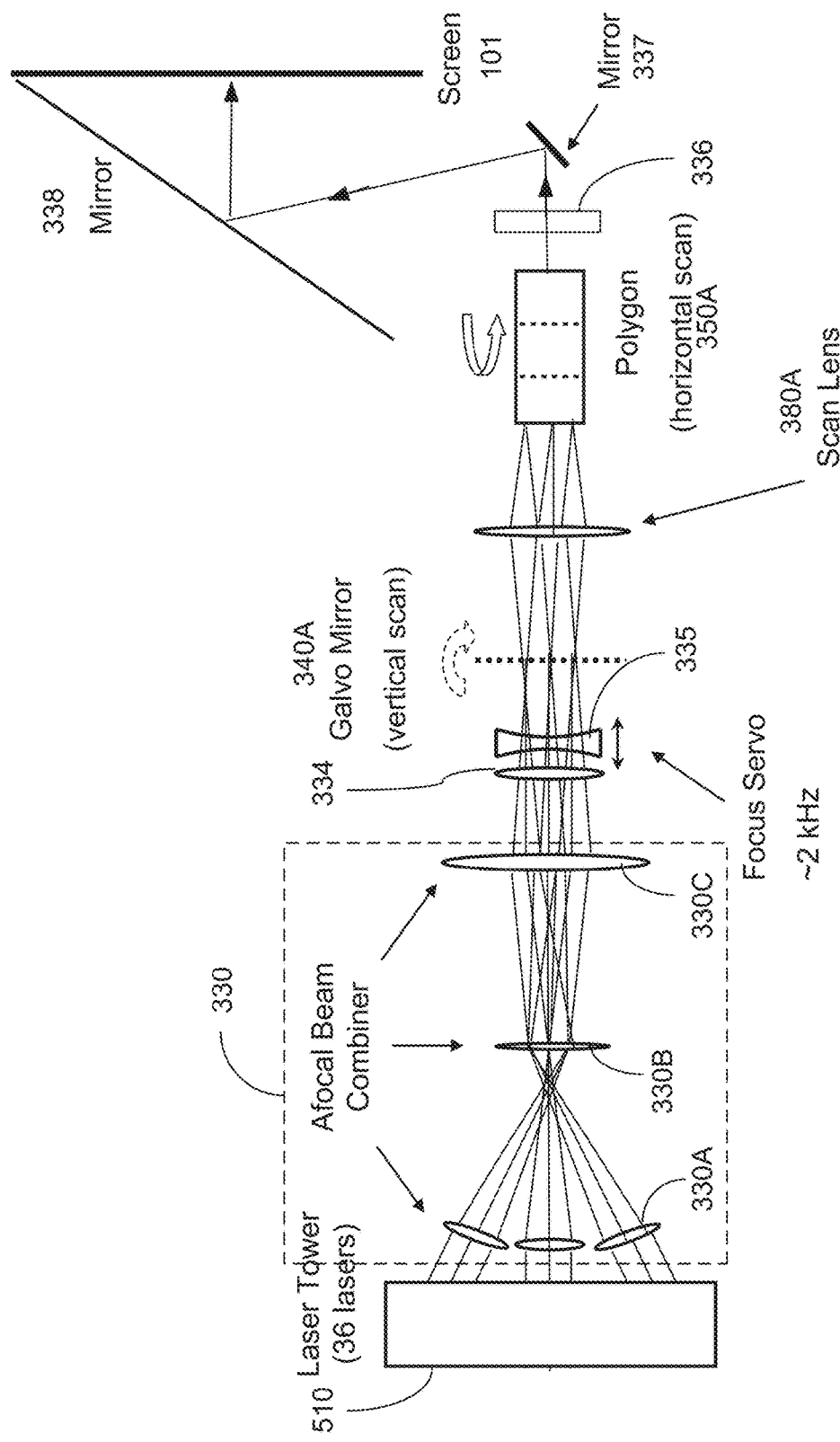
FIG. 5 shows another example implementation of the scanning beam laser display system in FIG. 1B.

FIG. 5 show another example of a laser scanning display system based on multiple lasers in a laser array 310 in a post-objective configuration where the order of the two scanning devices in FIG. 3C is reversed. This scanning beam display system includes lasers forming a laser array 310 to produce multiple laser beams, respectively, a beam scanning module with two scanners 340A and 350A placed two sides of a scan lens 380A in an optical path of the laser beams to scan the laser beams in two orthogonal directions onto the screen 101; and an afocal optical relay module 330 placed between the lasers 310 and the scanning module to include lenses 330A, 330B and 330C to reduce a spacing between two adjacent laser beams and to overlap the laser beams at the scanning module. In one implementation of the design in FIG. 3C, the scan lens 380 can be designed to image the reflective surface of the vertical scanner 340A onto the reflecting facet of the polygon 350A so that a relatively small polygon facet of a compact polygon can be used to reduce power consumption and the dynamic range of the polygon. Mirrors 337 and 338 are placed in the optical path between the polygon scanner 350A and screen 101 to fold the optical path with a small optical depth. In one implementation, the afocal optical relay module 330 can include a first lens having a first focal length to receive and focus the laser beams from the lasers; a second lens having a second focal length shorter than the first focal length and spaced from the first lens by the first focal length to focus the laser beams from the first lens; and a third lens having a third focal length longer than the second focal length and spaced from the second lens by the third focal length to focus and direct the laser beams from the second lens to the scanning module. Examples for the afocal optical relay module 330 are described in PCT application No. CT/US2006/041584 entitled "Optical Designs for Scanning Beam Display Systems Using Fluorescent Screens" and filed on Oct. 25, 2006 (PCT publication no. WO 2007/050662) and U.S. patent application Ser. No. 11/510,495 entitled "Optical Designs for Scanning Beam Display Systems Using Fluorescent Screens" and filed on Aug. 24, 2006 (U.S. publication no. US 2007-0206258 A1), which are incorporated by reference as part of the disclosure of this document.

In FIG. 3C, the laser beams are controlled to overlap in a single plane (i.e., the pupil plane). A single-axis scanning scanner upstream from the scan lens 380A, e.g., a galvo mirror, is located in the pupil plane and is used to scan all beams along one axis, which is the vertical direction in this example. The scan lens 380A can be a multi-function scan lens which is designed to have a sufficiently large field-of-view to accept the full angular range of the scanned beams from the upstream vertical scanner 150 (e.g., the galvo mirror). The scan lens 380A is a converging lens which brings the beams to focus at the screen 101. The scan lens 380A is also used to image the galvo mirror 340A onto the polygon reflecting facet on the downstream polygon scanner 350A. This imaging function allows the polygon 350A to be relatively small. Without imaging, the polygon 350A would be relatively large because the scanned beams naturally spread with increasing distance from the galvo mirror 340A. The scan lens 380A in FIG. 3C can be a single-element lens or can include multiple lens elements in order to perform its functions, e.g., focusing and re-imaging over the scanning range of the galvo mirror 340A.

Downstream from the scan lens 380A, the polygon scanner 350A scans the converging beams from the scan lens 380A onto the screen 101. The foci of the converging beams can, in general, lie on a curved surface. A focus servo is used to refocus the beams dynamically on to a planar surface of the screen 101. In this example, the focus servo includes at least two lens elements 334 and 335 that are separated by an air gap as shown. One of the two lenses (e.g., lens 334) has a positive focal length and the other (e.g., lens 335) has a negative focal length. An actuator is provided to control the relative spacing between the two lenses 334 and 335. The beams entering and exiting the focus servo are nominally collimated when the lenses comprising the focus servo are separated by a prescribed distance (i.e., the neutral or nominal position). In the example shown in FIG. 3C, one lens of the focus servo is stationary and the other is moved axially to allow dynamic refocusing of the beams. The movable lens (e.g., lens 335) is moved about its nominal position by a distance sufficient to bring the beams to focus on the screen 101. In the post-objective system, the output 2-D scanning beam can have optical distortions such as "bow" distortions in the horizontal direction. A distortion correcting optical module 336 with multiple lens elements can be provided in the optical path between the polygon scanner 350A and the screen 101 to reduce the optical distortions.

A scanning display system described in this specification can be calibrated during the manufacture process so that the laser beam on-off timing and position of the laser beam relative to the fluorescent stripes in the screen 101 are known and are controlled within a permissible tolerance margin in order for the system to properly operate with specified image quality. However, the screen 101 and components in the laser module 101 of the system can change over time due to various factors, such as scanning device jitter, changes in temperature or humidity, changes in orientation of the system relative to gravity, settling due to vibration, aging and others. Such changes can affect the positioning of the laser source relative to the screen 101 over time and thus the factory-set alignment can be altered due to such changes. Notably, such changes can produce visible and, often undesirable, effects on the displayed images. For example, a laser pulse in the scanning excitation beam 120 may hit a subpixel that is adjacent to an intended target subpixel for that laser pulse due to a misalignment of the scanning beam 120 relative to the screen along the horizontal scanning direction. When this occurs, the coloring of the displayed image is changed from the intended coloring of the image. Hence, a red pixel in the intended image may be displayed as a green pixel on the screen. For another example, a laser pulse in the scanning excitation beam 120 may hit both the intended target subpixel and an adjacent subpixel next to the intended target subpixel due to a misalignment of the scanning beam 120 relative to the screen along the horizontal scanning direction. When this occurs, the coloring of the displayed image is changed from the intended coloring of the image and the image resolution deteriorates. The visible effects of these changes can increase as the screen display resolution increases because a smaller pixel means a smaller tolerance for a change in position. In addition, as the size of the screen increases, the effect of a change that can affect the alignment can be more pronounced because a large moment arm in scanning each excitation beam 120 associated with a large screen means that an angular error can lead to a large position error on the screen. For example, if the laser beam position on the screen for a known beam angle changes over time, the result is a color shift in the image. This effect can be noticeable and thus undesirable to the viewer.

Figure 6A:
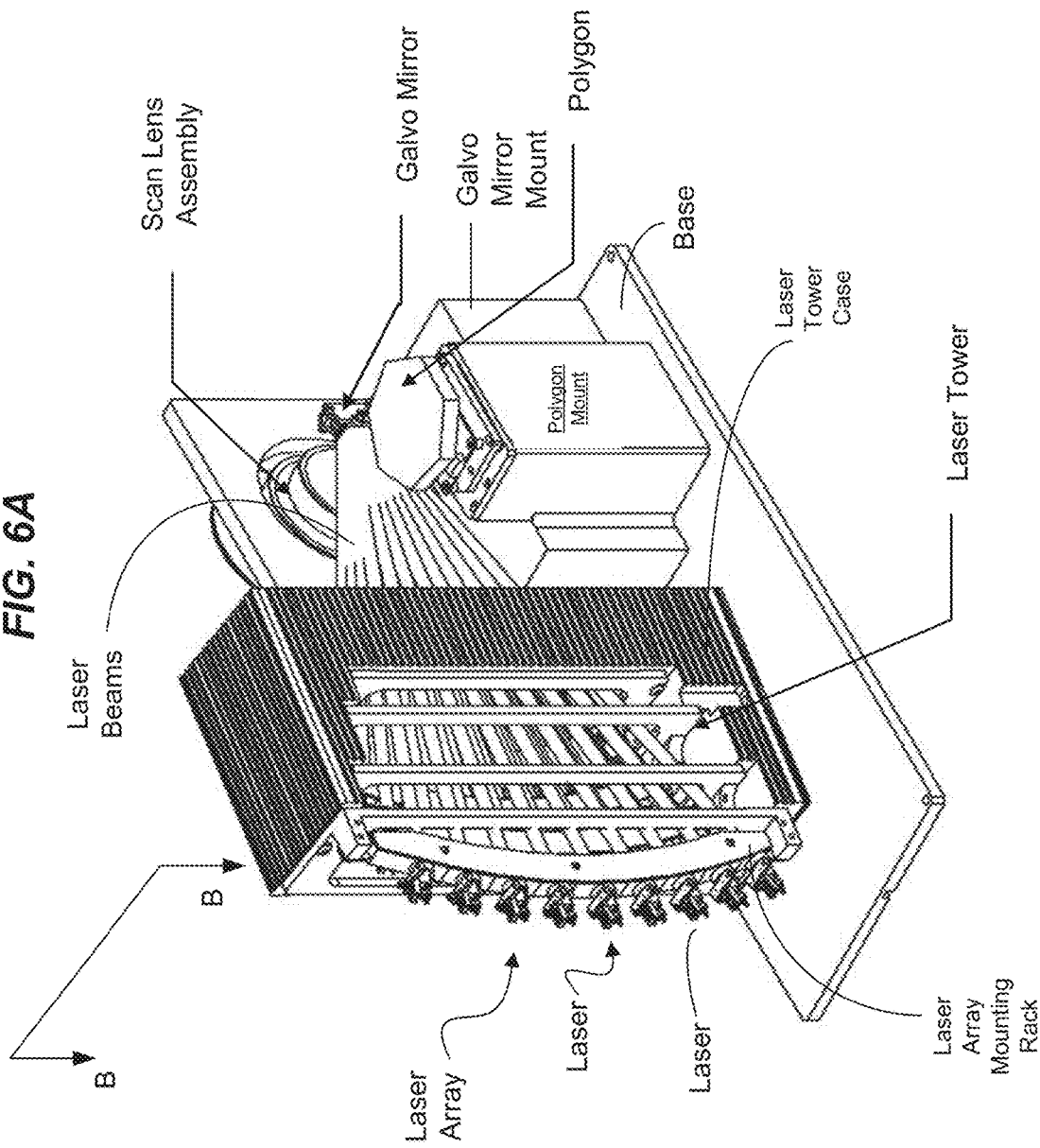
FIGS. 6A and 6B show an example of a laser module with an array of lasers to produce different scanning beams onto the screen.
Figure 6B:
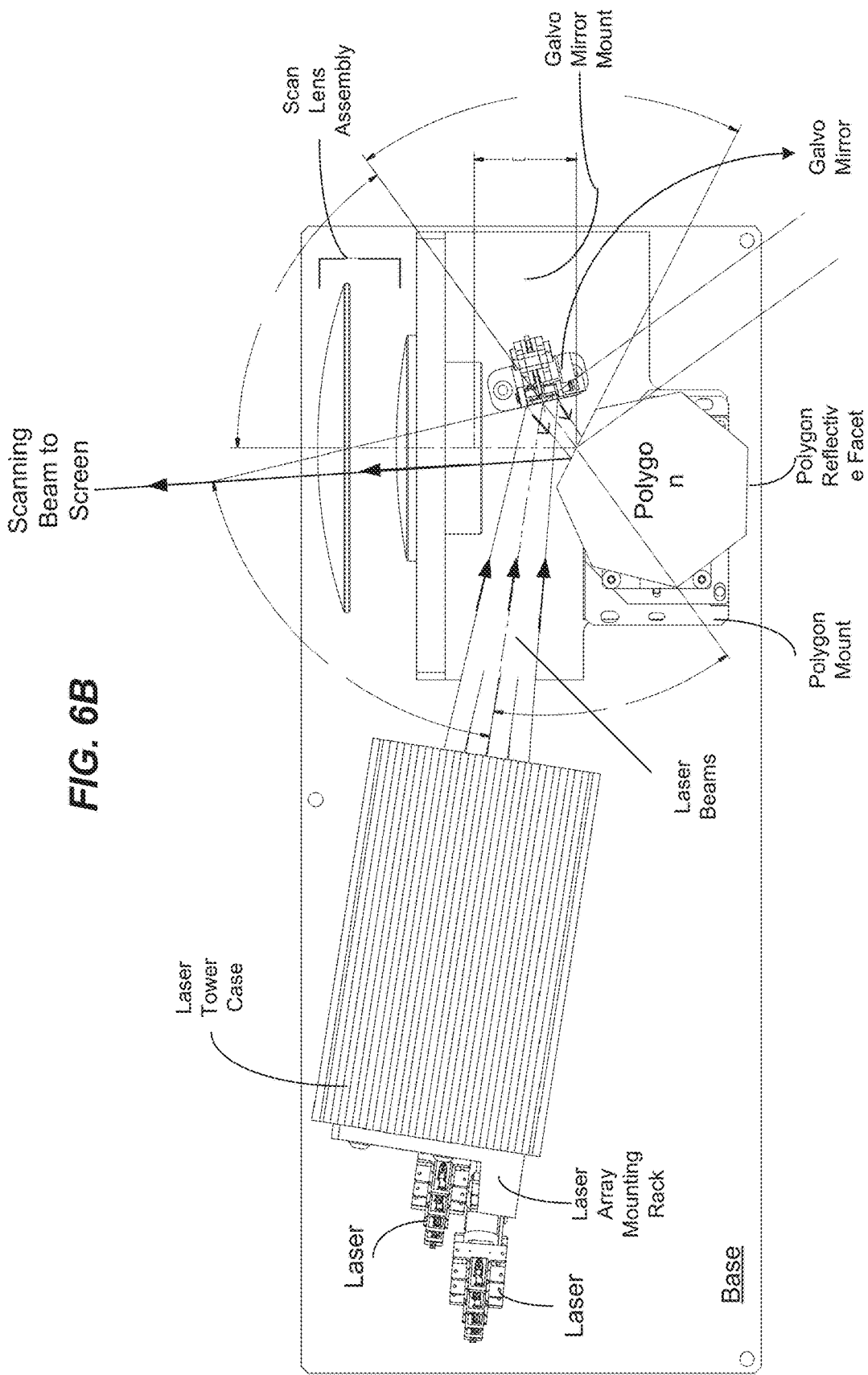

FIGS. 6A and 6B show an example of a laser module with an array of lasers to produce different scanning beams onto the screen 101. Each beam from a laser in the array is first reflected by a vertical scanning mirror such as a galvo mirror shared by all laser beams and then reflected by a polygon which scans all beams along the horizontal direction. A scan lens assembly which includes one or more lenses is positioned to receive reflected beams from the polygon and to project the received beams onto the screen. The laser array is mounted on a laser array mounting rack to hold the lasers at different positions along the vertical direction. As illustrated, the lasers are oriented in a fan configuration to point to the galvo mirror. A laser tower case is provided to hold the laser array mounting rack. A base is provided to support the laser tower the galvo mirror, the polygon and the scan lens assembly and hold these components in a fixed position relative to one another. A polygon mount which include a motor for the polygon, the power supply and the control circuit is mounted on the base. A galvo mirror mount is also fixed on the base to hold the glavo mirror in position and to hold the driver circuit for the galvo mirror. FIG. 6B shows the bird's eye view of the laser module along the direction BB indicated in FIG. 6A. The folded beam paths of all laser beams are shown.

Implementations of various alignment mechanisms are provided in this specification to maintain proper alignment of the scanning beam 120 on the desired sub-pixel to achieved desired image quality. These alignment mechanisms include reference marks on the screen, both in the fluorescent area and in one or more peripheral area outside the fluorescent area, emitted visible light in red, green and blue colors by the phosphor stripes to provide feedback light that is caused by the excitation beam 120 and represents the position and other properties of the scanning beam on the screen. The feedback light can be measured by using one or more optical servo sensors to produce one or more feedback servo signals and such feedback servo signals are used to generate a location map for red, green and blue sub-pixels on the screen. A servo control in the laser module 110 processes this feedback servo signal to extract the information on the beam positioning and other properties of the beam on the screen and, in response, adjust the direction and other properties of the scanning beam 120 to ensure the proper operation of the display system.

For example, a feedback servo control system can be provided to use peripheral servo reference marks positioned outside the display area unobservable by the viewer to provide control over various beam properties, such as the horizontal positioning along the horizontal scanning direction perpendicular to the fluorescent stripes, the vertical positioning along the longitudinal direction of the fluorescent stripes, the beam focusing on the screen for control of image color (e.g., color saturation) and image sharpness, and the beam power on the screen for control of image brightness and uniformity of the image brightness across the screen. For another example, a screen calibration procedure can be performed at the startup of the display system to measure the beam position information as a calibration map so having the exact positions of sub-pixels on the screen in the time domain. This calibration map is then used by the laser module 110 to control the timing and positioning of the scanning beam 120 to achieve the desired color purity. For yet another example, a dynamic servo control system can be provided to regularly update the calibration map during the normal operation of the display system by using servo reference marks in the fluorescent area of the screen to provide the feedback light without affecting the viewing experience of a viewer. Examples for using servo light produced by phosphor stripe dividers from the excitation light and feedback light from other reference marks for servo control and screen calibration are described in the incorporated-by-reference PCT Patent Application No. PCT/US2007/004004 entitled "Servo-Assisted Scanning Beam Display Systems Using Fluorescent Screens" (PCT Publication No. WO 2007/095329).

The display systems in this application provide servo control mechanisms based on a designated servo beam that is scanned over the screen by the same scanning module that scans the image-carrying excitation optical beam. This designated servo beam is used to provide servo feedback control over the scanning excitation beam to ensure proper optical alignment and accurate delivery of optical pulses in the excitation beam during normal display operation. This designated servo beam has an optical wavelength different from that of the excitation beam. As an example, this designated servo beam can be an IR servo beam that may be invisible to human. The examples below use an IR servo beam 130 to illustrate features and operations of this designated servo beam.

Referring to FIG. 1B, the laser module 110 produces an invisible servo beam 130 such as an IR beam as an example of the designated servo beam. The laser module 110 scans the servo beam 130 on to the screen 101 along with the excitation beam 120. Different from the excitation beam 120, the servo beam 130 is not modulated to carry image data. The servo beam 130 can be a CW beam. The stripe dividers on the screen 101 can be made reflective to the light of the servo beam 130 and to produce feedback light 132 by reflection. The servo beam 130 has a known spatial relation with the excitation beam 120. Therefore, the positioning of the servo beam 130 can be used to determine the positioning of the excitation beam 120. This relationship between the servo beam 130 and the excitation beam 120 can be determined by using reference servo marks such as a start of line (SOL) mark in a non-viewing area of the screen 101. The laser module 101 receives and detects the feedback light 132 to obtain positioning information of the servo beam 130 on the screen 101 and uses this positioning information to control alignment of the excitation beam 120 on the screen.

The servo beam 130 is invisible to human and thus does not produce any noticeable visual artifact on the screen 101 during the normal operation of the system when images are produced on the screen 101. For example, the servo beam 130 can have a wavelength in a range from 780 nm to 820 nm. For safety concerns, the screen 101 can be made to have a filter that blocks the invisible servo beam 130 from exiting the screen 101 on the viewer side. In this regard, a cutoff absorbing filter with a bandpass transmission range only in the visible spectral range (e.g., from 420 nm to 680 nm) may be used to block the servo beam 130 and excitation beam 120. The servo control of the excitation beam 120 based on the servo beam 130 can be performed dynamically during the normal operation of the system. This servo design avoids manipulation of the image-producing excitation beam 120 during the normal display mode for servo operations and thus avoids any visual artifacts that may be caused by the servo-related manipulation of the image-producing excitation beam 120.

In addition, the scattered or reflected excitation light by the screen 101 may also be used for servo control operations during a period when the system does not show images, e.g., during the startup period of the system or when the excitation beam 120 is outside the active display area of the screen 101. In such a case, the scattered or reflected excitation light, labeled as light 122, can be used as servo feedback light for servo control of, e.g., the horizontal alignment or the vertical alignment of each laser beam 120.

In the examples of the systems in FIGS. 3 and 4, the servo beam 130 is directed along with the one or more excitation beams 120 through the same optical path that includes the relay optics module 330A or 330B, the beam scanners 340 and 350, and the scan lens 360 or 380. Referring to FIG. 1B, the servo beam 130 is scanned along with the scanning excitation beams 120 one screen segment at a time along the vertical direction of the screen. The servo beam 130 is invisible and can be overlapped with a scanning path of one excitation beam 120 or along its own scanning path that is different from a path of any of the excitation beams 120. The spatial relation between the servo beam 130 and each excitation beam 120 is known and fixed so that the positioning of the servo beam 130 on the screen 101 can be used to infer positioning of each excitation beam 120.

A light source for generating the servo beam 130 and a light source for generating an excitation beam 120 can be semiconductor lasers in a light source module which can be an array of lasers and at least one of the lasers in the laser array can be a servo laser that produces the servo beam 130. In one implementation, the location of the servo laser is known relative to each excitation laser in the laser array in the laser module 110. The servo beam 130 and each excitation beam 120 are directed through the same relay optics, the same beam scanners and the same projection lens and are projected on the screen 101. Therefore, the positioning of the servo beam 130 on the screen 101 has a known relation with the positioning of each excitation beam 120 on the screen. This relation between the servo beam 130 and each excitation beam 120 can be used to control the excitation beam 120 based on measured positioning of the servo beam 130. The relative position relation between the servo beam 130 and each excitation beam 120 can be measured using the servo feedback, e.g., during a calibration process that may be separately performed or performed during the power-up period of the system. The measured relative position relation is used for the servo feedback control.

In operation, the laser beams can be scanned together based on the scanning shown in FIG. 4 to scan one screen segment at a time to sequentially scan different screen segments at different vertical positions to scan the entire screen. Because the IR servo laser is fixed in position with respect to each and every one of the excitation lasers, the positioning of the servo beam 130 produced by the IR servo laser on the screen 101 has a known relation with respect to each beam spot of an excitation beam 120 from each of the thirty-six excitation lasers.

FIG. 7 illustrates a scanning beam display system based on a servo control using the invisible servo beam 130. A display processor and controller 640 can be used to provide control functions and control intelligence based on servo detector signals from radiation servo detectors 620 that detect servo feedback light 132 from the screen 101. A single detector 620 may be sufficient and two or more servo detectors 620 can be used to improve the servo detection sensitivity.

Similarly, one or more radiation servo detectors 630 may also be used to collect excitation servo light 122 produced by scattering or reflecting the excitation beam 120 at the screen to provide additional feedback signals to the processor and controller 640 for the servo control. This use of the servo light 122 for feedback control can be an optional feature that is used in combination with the IR servo feedback control. In some system implementations, the IR servo feedback alone without the feedback based on the feedback light 122 shown in FIG. 6 can be sufficient to align the excitation beam 120 to the proper phosphor stripes on the screen 101. Examples for using the servo light 122 produced by phosphor stripe dividers for servo control are described in the incorporated-by-reference PCT Patent Application No. PCT/US2007/004004 entitled "Servo-Assisted Scanning Beam Display Systems Using Fluorescent Screens" (PCT Publication No. WO 2007/095329).

In FIG. 7, a scanning projection module 610 is provided to scan and project the excitation and servo beams 120 and 130 onto the screen 101. The module 610 can be in a post-objective configuration or a pre-objective configuration. As illustrated, the image data is fed to the display processor and controller 640 which produces an image data signal carrying the image data to the signal modulator controller 520 for the excitation lasers 510. The servo laser which is among the excitation lasers in the array 510 is not modulated to carry image data. The signal modulation controller 520 can include laser driver circuits that produce laser modulation signals carrying image signals with image data assigned to different lasers 510, respectively. The laser control signals are then applied to modulate the lasers in the laser array 510, e.g., the currents for laser diodes to produce the laser beams 512. The display processor and controller 640 also produces laser control signals to the lasers in the laser array 510 to adjust the laser orientation to change the vertical beam position on the screen 101 or the DC power level of each laser. The display processor and controller 5930 further produces scanning control signals to the scanning projection module 610 to control and synchronize the horizontal polygon scanner and the vertical scanner.

Figure 8:
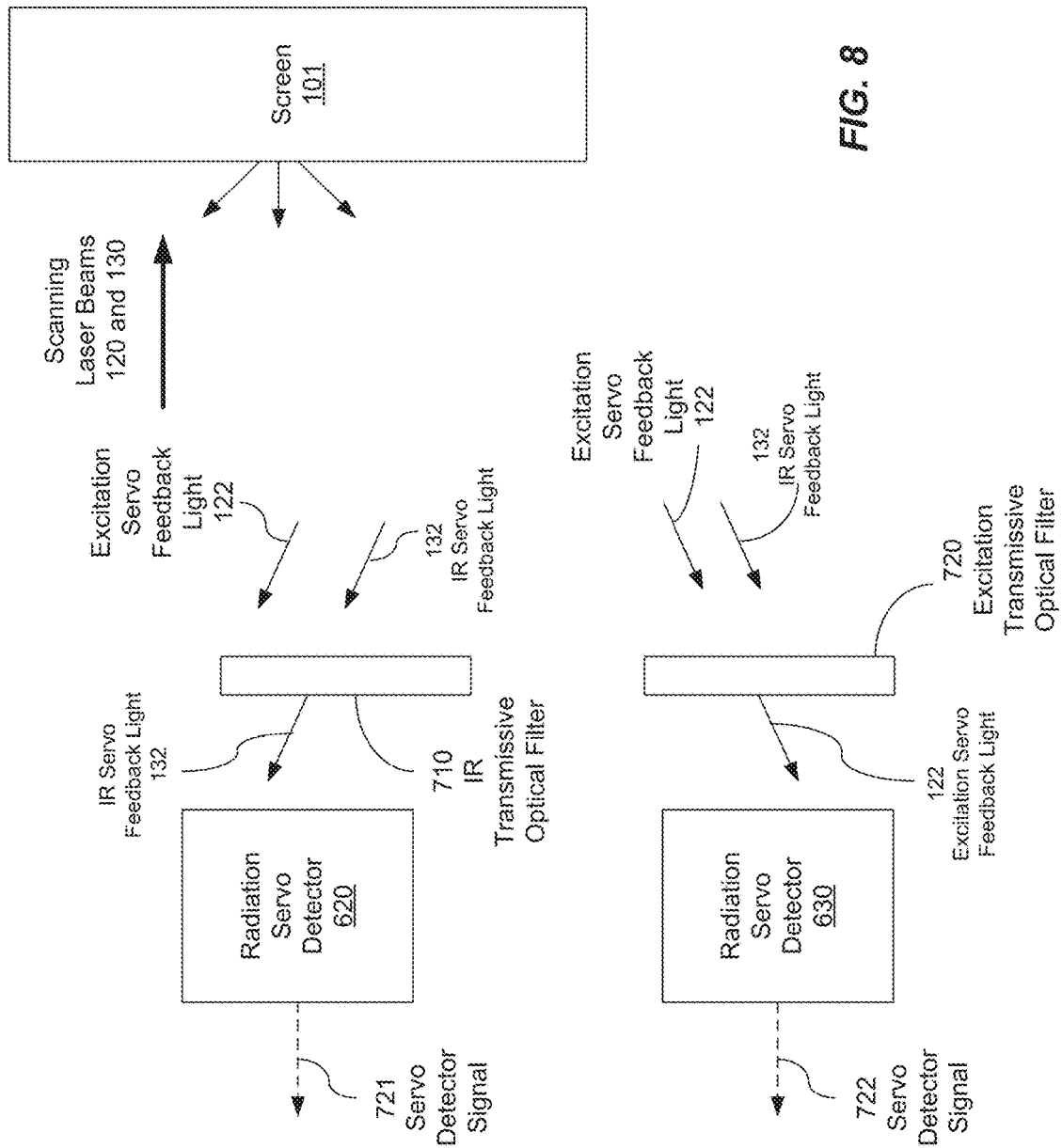
FIG. 8 shows an example of a servo detector for detecting the servo feedback light in FIG. 7.

FIG. 8 shows one example of the servo detector design where a servo detector 620 detects the servo feedback light 132. The servo detector 620 can be a detector designed to be sensitive to light of the servo beam wavelength for the invisible servo beam 130 and less sensitive to other light such as the visible light and the excitation light. An optical filter 710 can be used to filter the light from the screen 101 to selectively transmit the servo feedback light 132 while blocking light at other wavelengths, such as the excitation light and visible light. Such a filter allows a wider range of optical detectors to be used as the servo detector. FIG. 7 also shows an example of an optional servo detector 630 for detecting the servo feedback light 122 at the excitation wavelength. The servo detector 620 can be a detector designed to be sensitive to light of the excitation wavelength of the excitation beam 120 and less sensitive to light at wavelengths of the servo beam 130 and the visible light emitted by the screen 101. An optical filter 720 can be used to filter the light from the screen 101 to selectively transmit the excitation servo feedback light 122 while blocking light at other wavelengths. The servo detector signals 721 and 722 from the servo detectors 620 and 630, respectively, are directed to the processor and controller 640 for servo control operations.

Figure 9:
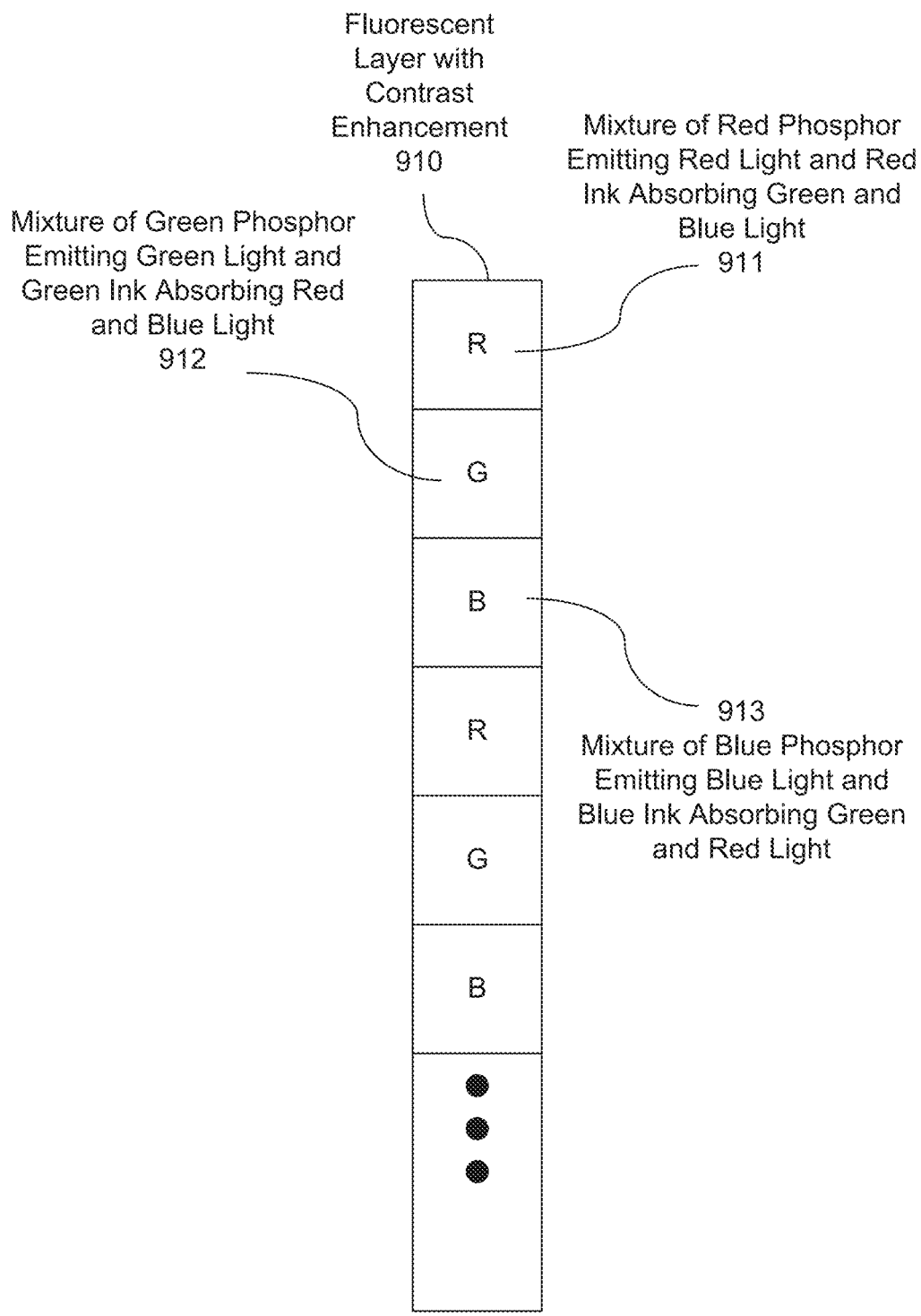
FIG. 9 shows a screen design having pigments embedded inside phosphor materials without a separate color filter layer.

FIG. 9 shows an example of a display screen 101 that uses red, green, and blue phosphor materials with built-in contrast-enhancing and color controlling capabilities for emitting red, green and blue light, respectively, in a common light-emitting phosphor layer 910 of parallel phosphor stripes. Consider three consecutive red, green and blue phosphor stripes 911, 912 and 913. The material for the red phosphor stripe 911 is a mixture of a red phosphor capable of emitting red light and a red ink or pigment which transmits the red light and absorbs other light including the green and blue light. Since the red ink or pigment is mixed with the red phosphor, one of the notable characteristics is that the red ink or pigment substantially transmits below the wavelength of around 420 nm (e.g., 405 nm) in order to prevent absorbing the excitation light. Furthermore, the red ink or pigment can substantially transmit at a wavelength above around 580 nm to allow for the emitted red color from the red phosphors. The material for the green phosphor stripe 912 is a mixture of a green phosphor emitting green light and a green ink or pigment which transmits the green light and absorbs other light including the red and blue light. Since the green ink or pigment is mixed with the green phosphor, one of the notable characteristics is that the green ink or pigment substantially transmits below the wavelength of around 420 nm in order to prevent absorbing the excitation light. Furthermore, the green ink or pigment can substantially transmit at a wavelength window of above around 480 nm and below about 580 nm to allow for the emitted green color from the green phosphors.

The material for the blue phosphor stripe 913 is a mixture of a blue phosphor emitting blue light and a blue ink or pigment which transmits the blue light and absorbs other light including the red and green light. Since the blue ink or pigment is mixed with the blue phosphor, one of the notable characteristics is that the blue ink or pigment substantially transmits below the wavelength of around 480 nm in order to prevent absorbing the excitation light (below ~420 nm) and to allow for the emitted blue color from the blue phosphors.

The light-emitting layer 910 in FIG. 9 includes, within each phosphor stripe, a phosphor mixture that further includes (1) a light-emitting phosphor material that emits light of a designated color in an emission spectral bandwidth, and (2) a pigment material that may include one or more color filtering pigments dispersed and embedded in the light-emitting phosphor material to transmit light of a respective designated color of the phosphor stripe while absorbing light of colors different from the respective designated color. The selection of the materials in (1) and (2) can be carefully designed to achieve desired CIE coverage.

In one example, a PB15:4 concentration can be used to achieve over 80% transmission at 480 nm, 40% transmission at 405 nm.

Figure 10:
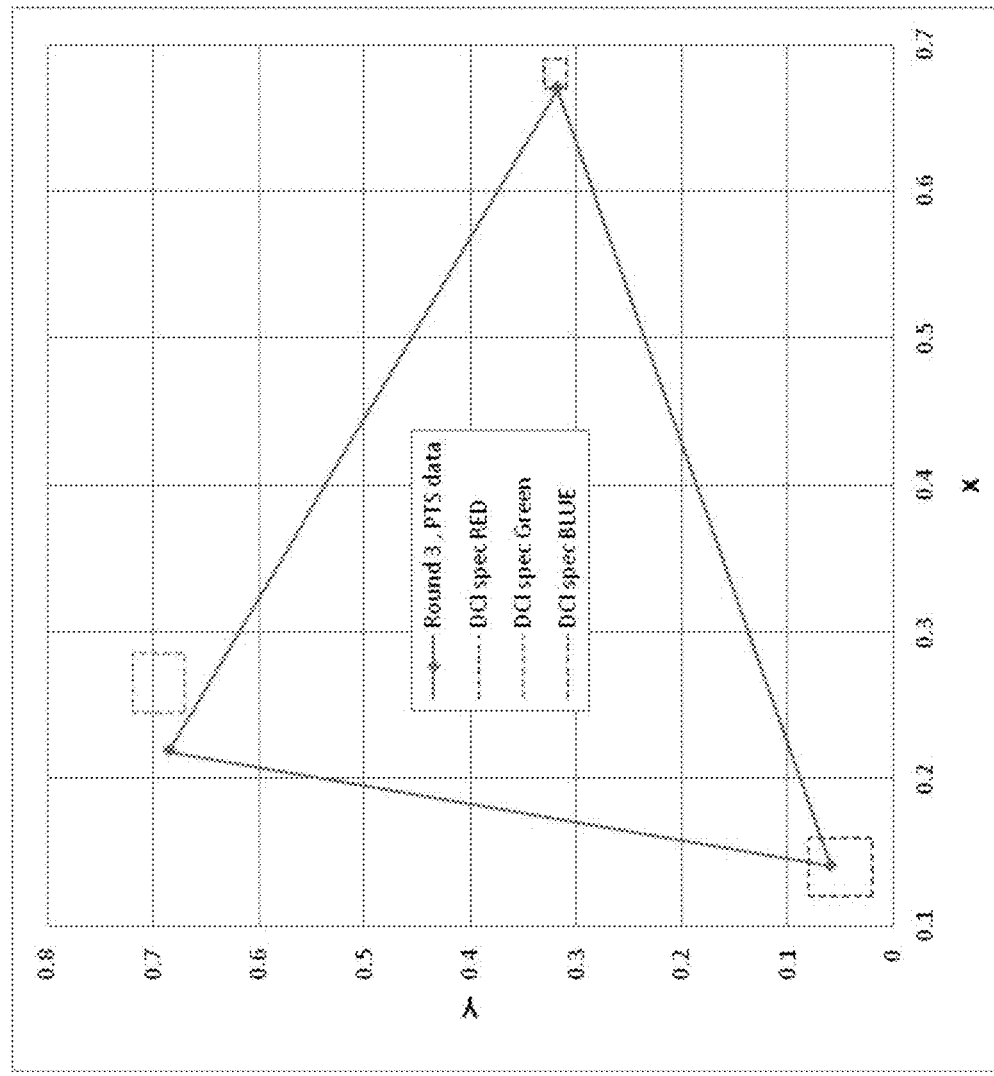
FIG. 10 shows a CIE diagram with DIC P3 color areas for red, green and blue.

FIG. 10 shows a CIE diagram with the DCI P3 color indicators. A light-emitting phosphor material for rend in FIG. 9 can be selected to reach a desired indicated red color area (e.g., the CII red color region). Within this red color region, the embedded pigment material for the red color can be designed to further select the final red color by choosing its red transmission profile. Similar selections can be made to the green and blue phosphor materials and their corresponding embedded pigment materials. In addition to this final color selection within the emission spectrum of a phosphor material by the pigment material, the pigment material can also be designed to provide narrowing of the emission bandwidth for a particular color, i.e., reducing an output spectral bandwidth of the respective designated color produced by the phosphor material to be narrower than the emission spectral bandwidth of that particular phosphor material. This spectral bandwidth narrowing for the emission can be used to enhance the color purity and shape the primary colors for the color gamut of a particular display screen to achieve desired color reproduction in the display screen.

Examples of red, green and blue phosphor materials are provided below.

Figure 11:
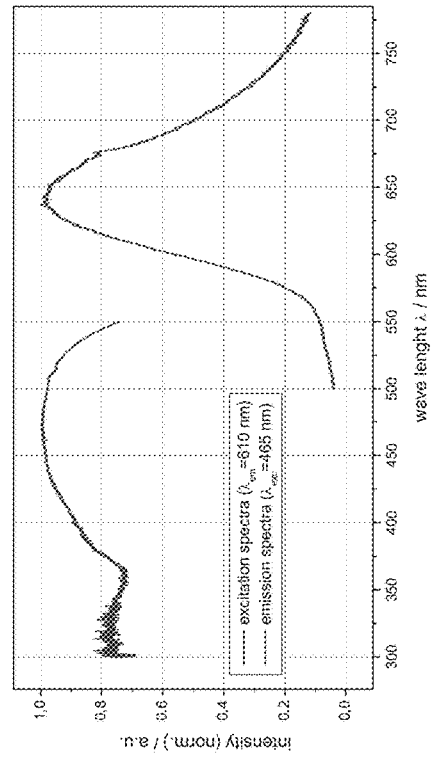

FIG. 11 shows examples of red phosphor materials that emit red light by absorbing UV light. The listed example materials are modified alkaline earth silicon nitrides and emit red light at a wavelength near 635 nm. FIG. 12 shows an example of an orange phosphor material that emits orange light near 610 nm by absorbing UV light. An orange-emitting phosphor can be mixed with one or more red-emitting phosphors to produce brighter red colors for display screens. Other examples include $(Ba,Ca,Sr,Eu)_2Si_5N_{8-2x}O_xC_X$ (0<x<12) or $Si_{3-6}Al_{0.01-3}N_{5-8}:Eu_{0.001-0.1}$.

FIG. 13 shows an example of a green phosphor material $(Sr,Ba,Ca)_2SiO_4:Eu$ that emits green light near 525 nm by absorbing UV light. Other examples include $Sr_{0.01-1.2}Ca_{0.01-1.2}Al_{0.8-1.2}Si_{0.8-1.2}N_{2.0-4.0}:Eu_{0.001-0.1}$.

Figure 14:
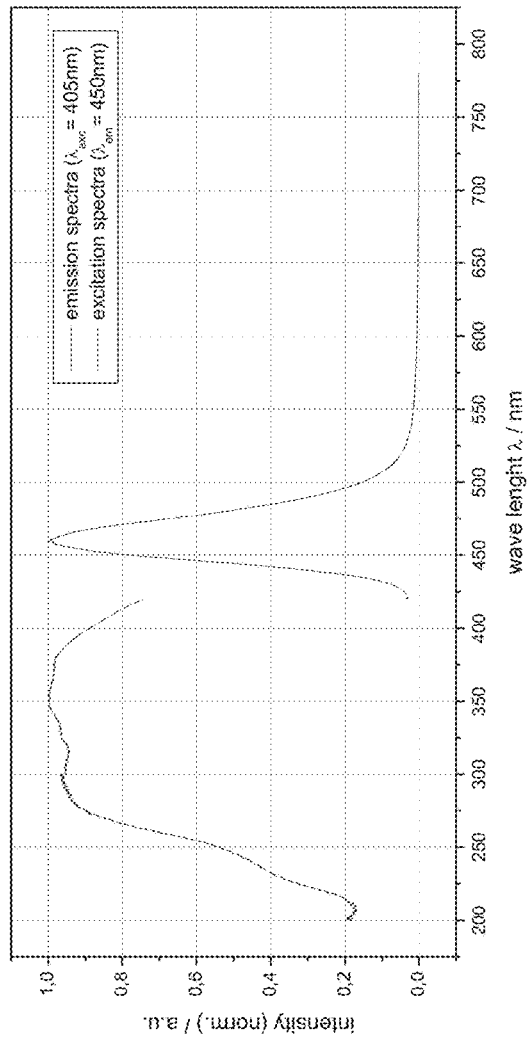

FIG. 14 shows an example of a blue phosphor material $Sr_3MgSi_2O_8:Eu$ that emits blue light near 460 nm by absorbing UV light.

Examples of red, green and blue pigments for being embedded and dispersed in phosphor materials are provided below. In addition, their color shaping effects when combined with their host light-emitting phosphor materials are illustrated.

Figure 15A:
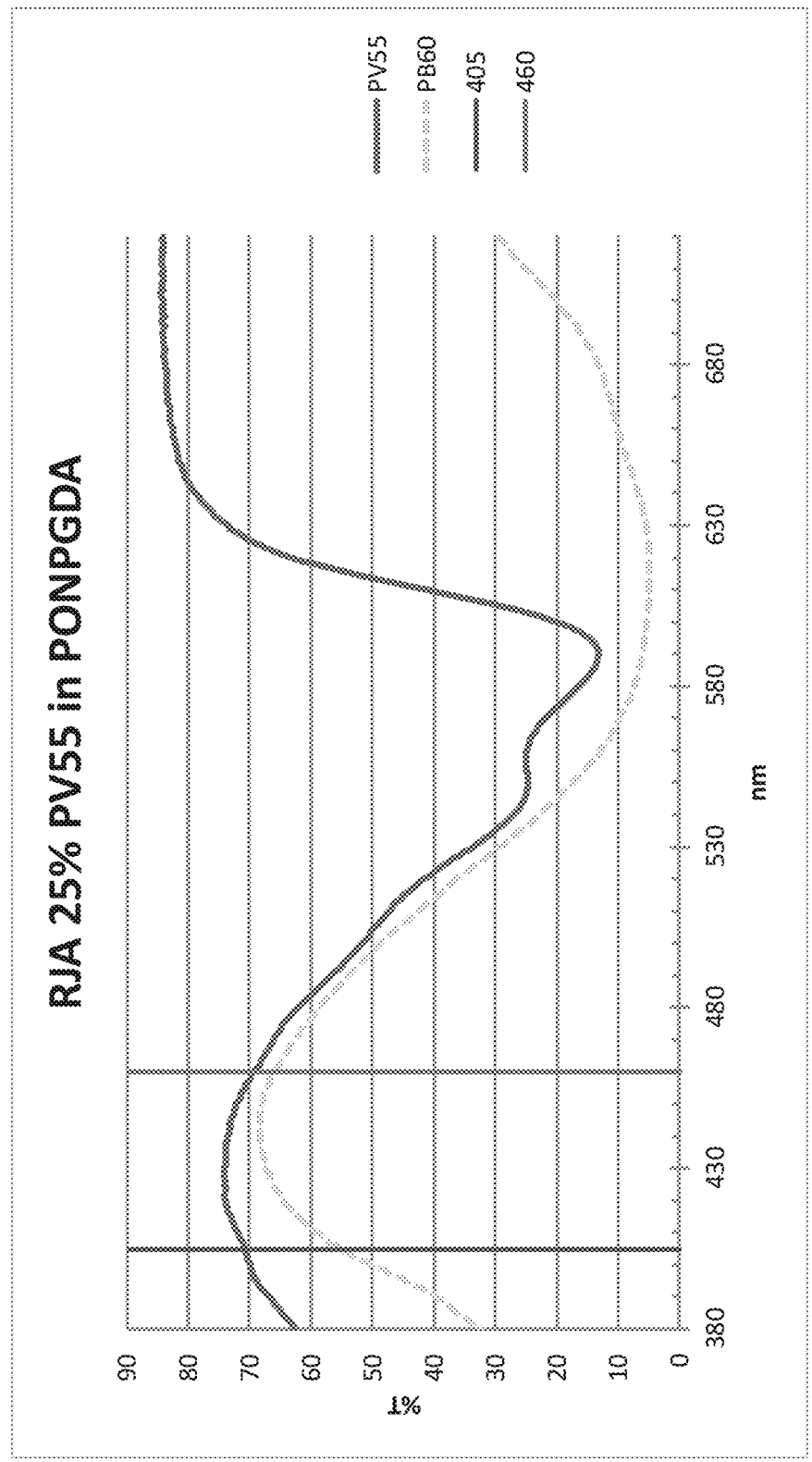
FIG. 15A shows an example of the spectral properties of a red pigment.

FIG. 15A shows an example of the spectral properties of a red pigment PV55. Other examples of red pigments include PV19, PR254, PR264, a quinacridone or diketopyrrolopyrrole. Another example is PR122.

Figure 15B:
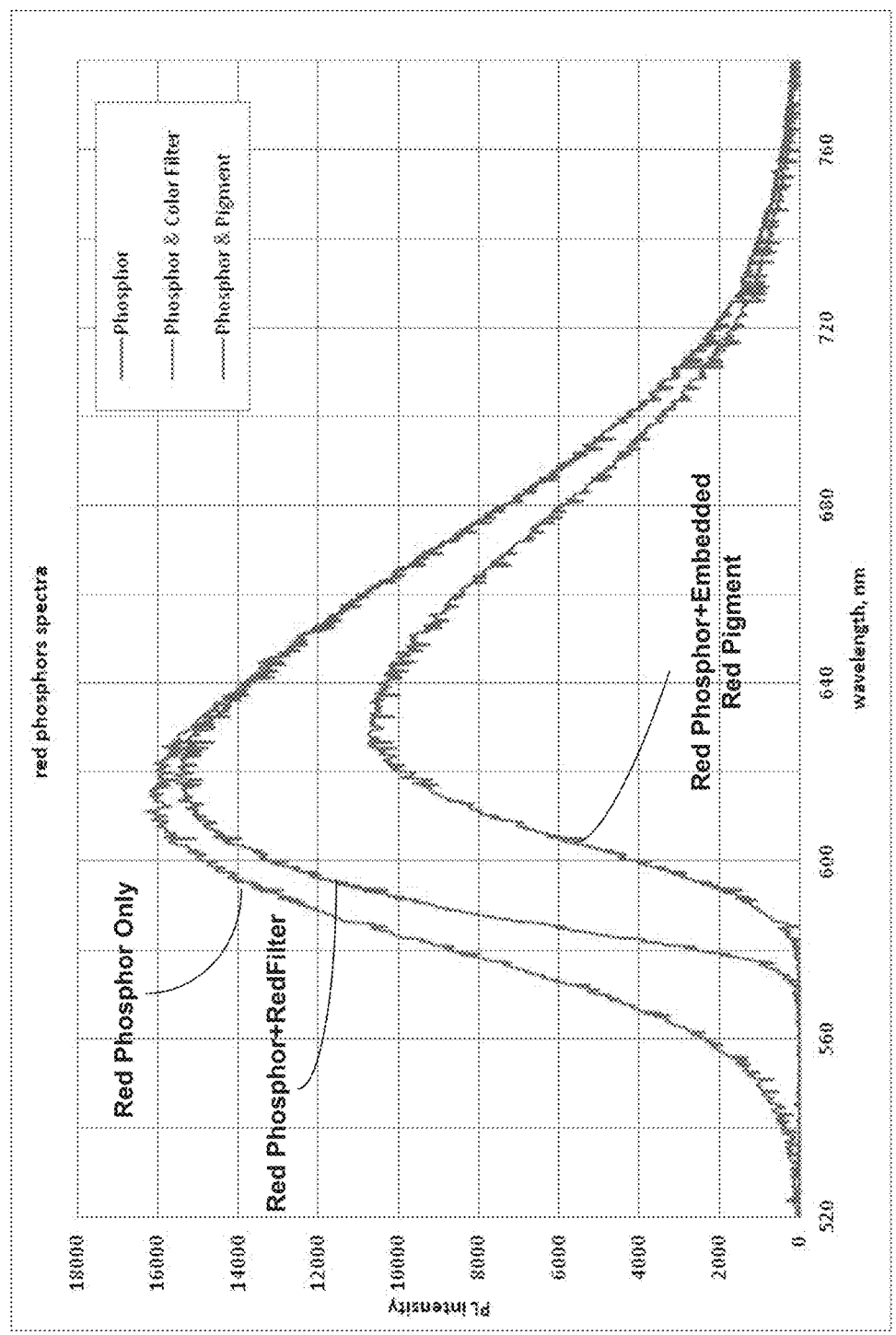
FIG. 15B shows spectral properties of a red phosphor under different screen designs.

FIG. 15B shows the spectral properties of a red phosphor under different screen designs. When a red color filter is placed over the red phosphor region, the combined red emission spectrum can be modified as shown. Using an embedded red pigment in a red phosphor can also be used to modify the overall red emission spectral profile and, in addition, to shift the peak emission in wavelength to finely tune the red color and to narrow the red emission spectral bandwidth to enhance the color purity.

Figure 16A:
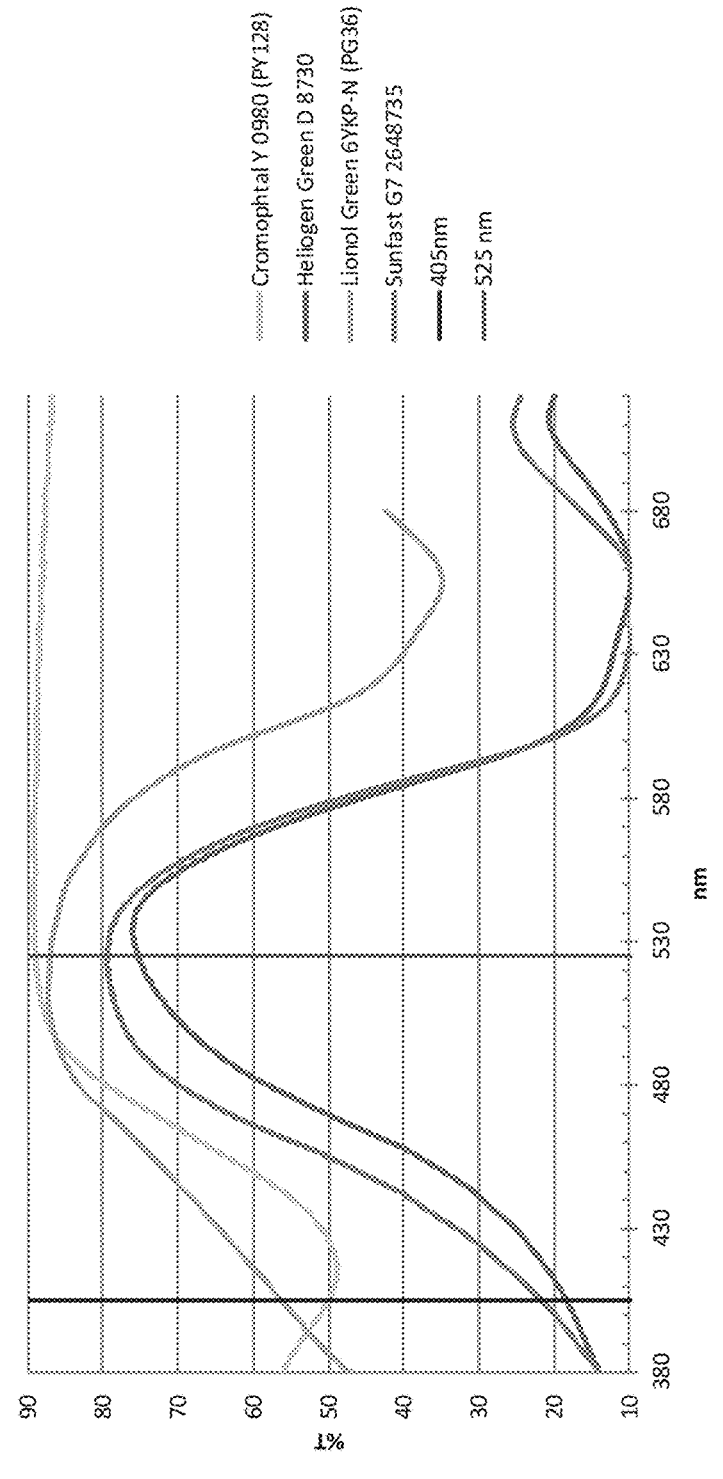
FIG. 16A shows an example of the spectral properties of a green pigment.

FIG. 16A shows an example of the spectral properties of green pigments Heliogen Green D 8730, PG36, Sunfast Green 72648735 and a yellow pigment PY128. Other examples of green pigments include PG7, a combination of PB15:4 and PY128, a combination of PB15:4, PY150, copper bromochlorophthalocyanine, copper perchlororphthalocyanine, a combination of a copper phthalocyanine and a disazo or azo pigment (e.g., CAS Registry #79953-85-8), or a combination of copper phthalocyanine and a nickel azomethine. Additional green pigments include a combination of PB15:4 and PY129, or a combination of PB15:4 and PY110.

Figure 16B:
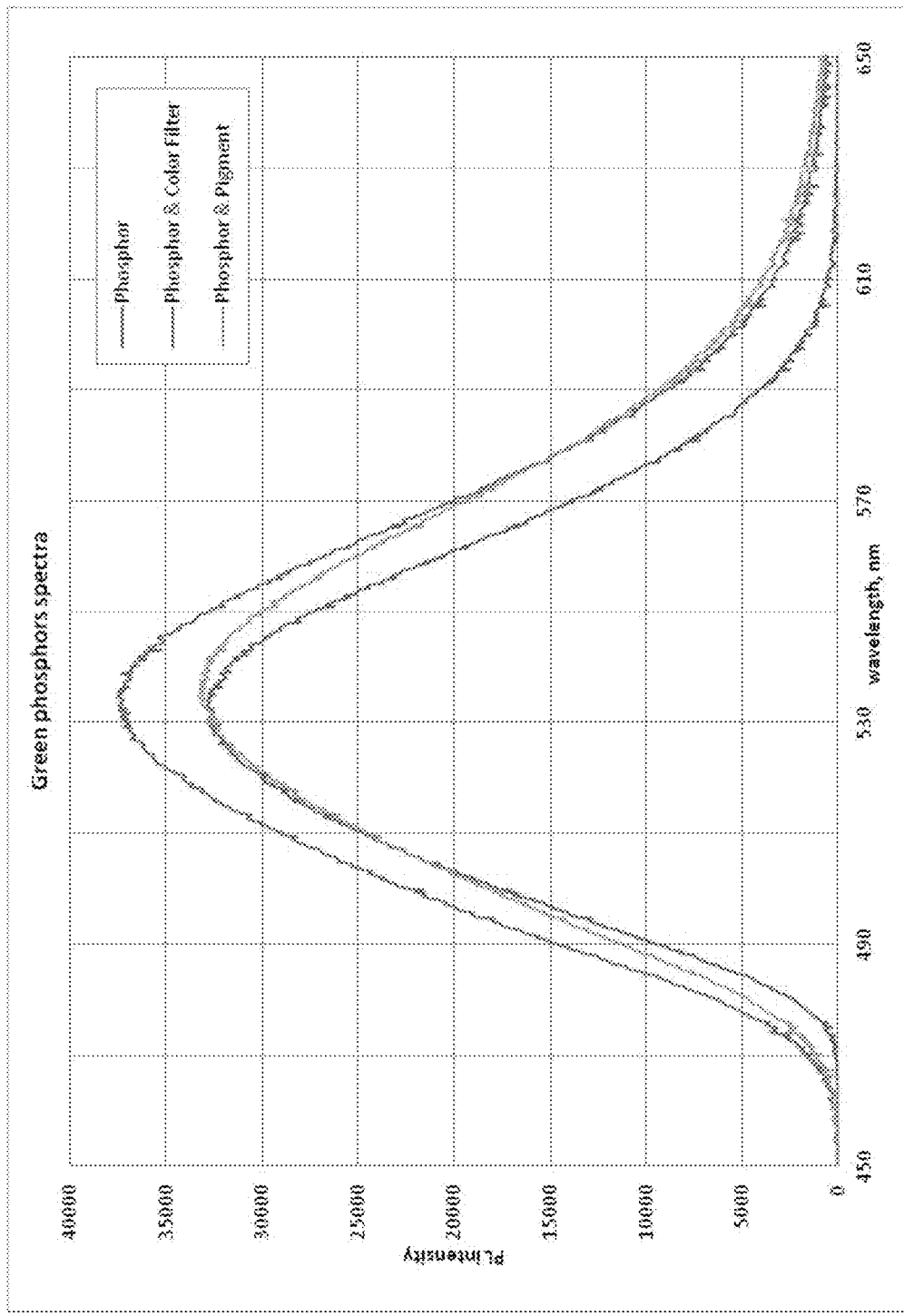
FIG. 16B shows spectral properties of a green phosphor under different screen designs.

FIG. 16B shows the spectral properties of a green phosphor under different screen designs. When a green color filter is placed over the green phosphor region, the combined green emission spectrum can be modified as shown. Using an embedded green pigment in a green phosphor can also be used to modify the overall green emission spectral profile and, in addition, to shift the peak emission in wavelength to finely tune the green color and to narrow the green emission spectral bandwidth to enhance the color purity.

FIG. 17A shows an example of the spectral properties of a blue pigment PG15:4, PG15:6 and PG60. Other examples of blue pigments include indanthrone or copper phthalocyanine.

Figure 17B:
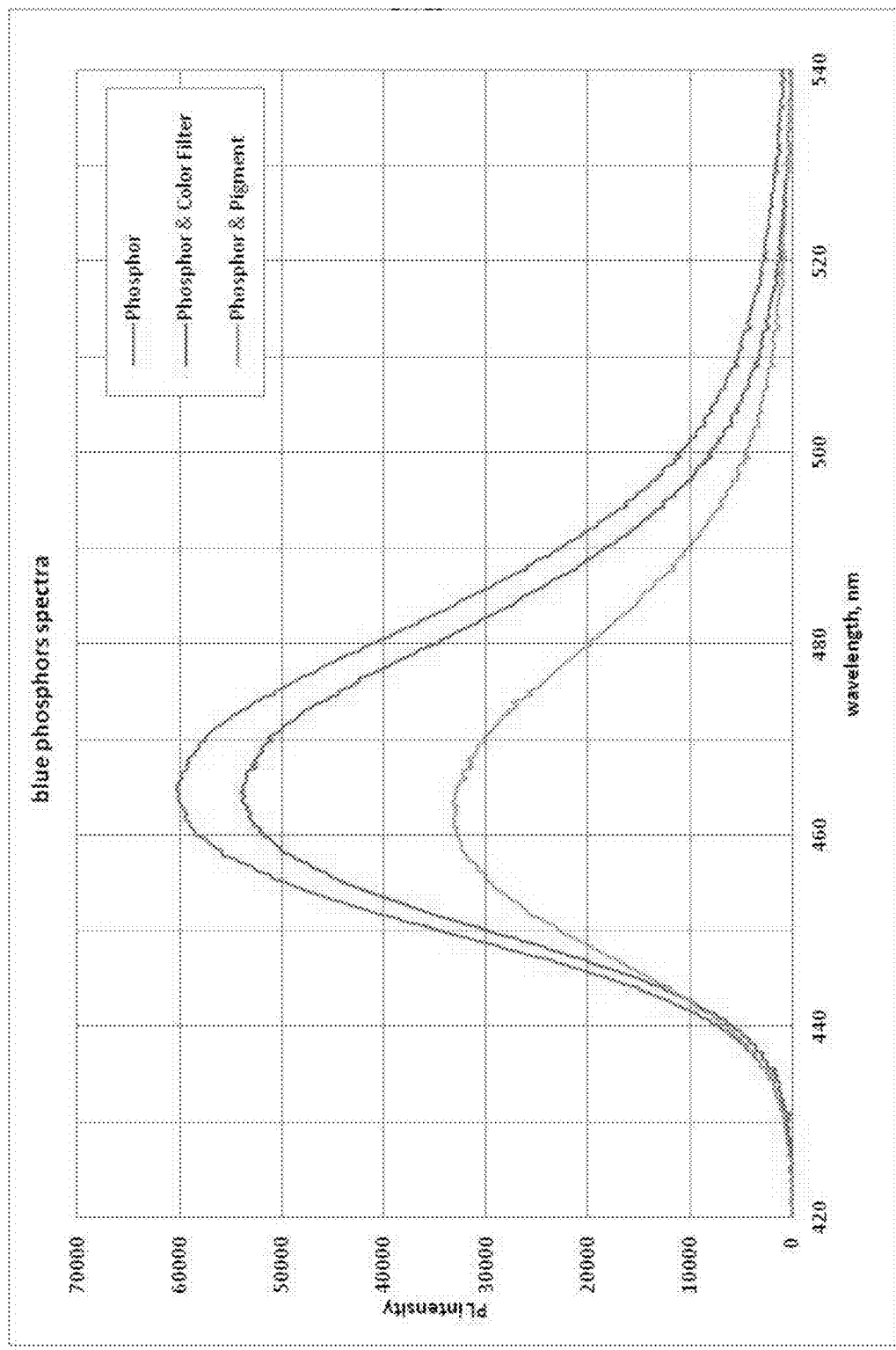
FIG. 17B shows spectral properties of a blue phosphor under different screen designs.

FIG. 17B shows the spectral properties of a blue phosphor under different screen designs. When a blue color filter is placed over the blue phosphor region, the combined blue emission spectrum can be modified as shown. Using an embedded blue pigment in a blue phosphor can also be used to modify the overall blue emission spectral profile and, in addition, to shift the peak emission in wavelength to finely tune the blue color and to narrow the blue emission spectral bandwidth to enhance the color purity.

As illustrated in FIGS. 15A, 16A and 17A, each of the spectral profiles of individual pigments exhibits a particular peak transmission wavelength for the corresponding color to be transmitted by the pigment (where the pigment exhibits a peak transmission of the light while attenuating light transmission at other colors), a particular transmission bandwidth for the corresponding color and a particular overall transmission shape for the corresponding color. Sometimes, a particular pigment spectral profile may be needed but is missing from existing or available pigments.

One aspect of the disclosed technology in this document is to combine two or more different pigments to produce such a desired pigment spectral profile. Therefore, each phosphor region or stripe on the screen 101 in FIGS. 1A and 1B can include two or more color filtering pigments embedded in a particular light-emitting phosphor material where the different color filtering pigments exhibit different optical transmission spectral profiles for two different colors to effectuate a combined optical transmission spectral profile that is for a respective designated color of the phosphor region and has the output spectral bandwidth narrower than the emission spectral bandwidth of the light-emitting phosphor material. For example, a light-emitting layer may include green phosphor regions that emit green light, and two or more color filtering pigments embedded in the light-emitting phosphor material in each green phosphor region includes (1) a combination of PB15:4 that transmits blue light and PY128 that transmits yellow light, (2) a combination of PB15:4 that transmits blue light and PY150 that transmits yellow light, or (3) a first color filtering pigment containing PY128 to transmit a yellow light and a second color filtering pigment containing Heliogen Green D 8730, PG36, or Sunfast G7 2648735 to transmit green light.

Alternatively, each phosphor region or stripe on the screen 101 in FIGS. 1A and 1B can include two or more color filtering pigments embedded in a particular light-emitting phosphor material where the different color filtering pigments exhibit different optical transmission spectral profiles within the same general color to effectuate a combined optical transmission spectral profile that is for a respective designated color of the phosphor region and has the output spectral bandwidth narrower than the emission spectral bandwidth of the light-emitting phosphor material. For example, a light-emitting layer may include blue phosphor regions that emit blue light, and two or more color filtering pigments embedded in the light-emitting phosphor material in each blue phosphor region includes a first color filtering pigment containing PB60 RJA D3410-B60 to transmit a blue light and a second color filtering pigment containing PB15:6 RJA D3410C-15:6 to transmit blue light. Additional blue pigments include PB27, PB28, and PB29. Two or more different green pigments embedded in a green phosphor material can include, e.g., include $(Sr,Ba,Ca)_2SiO_4:Eu$; $Sr_{0.01-1.2}Ca_{0.01-1.2}Al_{0.8-1.2}Si_{0.8-1.2}N_{2.0-4.0}:Eu_{0.001-1.1}$ and PG36 Lionol Green 6YKP-N, PG7 Heliogen Green D 8730, PG7 Sunfast Green 7 264-8735, PB15:4+PY128 (e.g., RJA D3410-B15:4+Cromophtal Yellow D 0980 J), or PB15:4+PY150 (e.g., RJA D3410-B15:4+RJA D3410 Y150). Two or more different red pigments embedded in a red phosphor material can include, e.g., $(Ba,Ca,Sr, Eu)_2Si_5N_{8-2x}O_xC_X$ (0<x<12); $Si_{3-6}Al_{0.01-3}N_{5-8}:Eu_{0.001-0.1}$ and PV19 red shade RJA dispersion, PV55 RJA dispersion, PR254 Irgaphor Red 3612 CF, PR264 Irgazin Rubine L 4030 NA.

In addition to selection of chemical compositions of the materials, the relative amount of a total amount of the pigment material containing one or more pigments can also be a parameter to be properly controlled to achieve several effects. One effect is the relative peak power of a particular color relative to peak power levels of other colors. Another effect is the absorption of the UV excitation light that the pigment material may absorb, thus leading to a decrease in the overall optical conversion efficiency from UV light to produced color light in the display screen. Under those and other considerations, the one or more color filtering pigments embedded in a light-emitting phosphor material may have a total weight less than 2 percent of a total weight of the light-emitting phosphor material or mixture to prevent reduction of an amount of the excitation light that reaches, and is absorbed by, the light-emitting phosphor material. In some implementations, each color filtering pigment embedded in the light-emitting phosphor material has a total weight less than 1 percent of a total weight of the light-emitting phosphor material or mixture.

A phosphor material described in this patent document can include one or more active phosphor materials that emit visible light of a desired color by absorbing the excitation light. A metal compound or transition or alkaline earth metal compound is commonly used as an active phosphor material in which transition metal ions are the activators and emit the desired visible light. Such a metal compound may be a compound of Ca, Sr, Ba, or Eu, among others. Devices that use phosphor materials to produce visible light may be configured to produce visible light at a particular desired color or a proper mixture of different specific colors such as white light. For example, white LED light sources can be designed to combine visible light of different colors (e.g., red, green and blue) emitted by different phosphor materials excited by LED light to produce the while output light. For another example, a screen formed of different phosphor regions that respectively emit light of different colors when illuminated by excitation light can be used to display color images.

Phosphor materials described in this document can be used in the above and other applications and are composite phosphor materials that include two or more different transition metal compounds that, under optical excitation of the same excitation light, emit visible light at spectrally close but different spectral wavelengths or bands that spectrally overlap to produce a desired color. Such a composite phosphor material can be used alone to produce light of the desired color or be combined with another light to produce mixed light. In addition, a composite phosphor material designed for emitting visible light of a particular color may include one or more additive materials that mix with the two or more different transition metal compounds to achieve certain material properties.

One technical benefit of using a composite phosphor material having two or more different transition metal compounds is the ability to control the selection of the transition metal compounds and their relative amounts to achieve the desired color in the output light produced by the composite phosphor material. As such, the color of the light is not limited by the natural colors of transition metal ions and a wide range of colors can be generated by selecting the proper composite phosphor material. In applications where the color of the visible light is produced by mixing visible light of two or more different colors, the freedom in selecting certain colors of the different colors may be limited so that a particular color may have to be set at a particular wavelength or wavelength range based on the colors of other light in the mixture in order to achieve the desired color in the combined light. In such applications, using composite phosphor materials as described in this document provides this ability to set a particular color may at a particular wavelength or wavelength range.

Consider an example for producing color light by mixing red, green and blue light. The choices for the wavelengths for the green and blue light tend to be limited either because the light sources (such as LEDs or laser diodes) that directly emit green and blue light or because the phosphor materials that emit green and blue light are limited. Therefore, there exits the need to provide composite phosphor materials that emit red light at various wavelengths in the red color region to allow the red color to be finely tuned to produce the desired color in mixing the red, green and blue light. Various composite phosphor materials for emitting red light are provided in this document to allow tuning the red color by controlling the compositions of the transition metal compounds and their relative amounts in designing phosphors in LED-based lighting devices and display screens.

Various transition metal compounds used in phosphor materials can be more expensive than others. Therefore, another benefit of using composite phosphor materials for emitting red light is to use as much as possible one or more relatively inexpensive transition metal compounds in designing a particular red-emitting composite phosphor material while still achieving the desired color and other performance metrics for the specific application to reduce the overall cost of the composite phosphor material. This aspect of the techniques described in this document can be important for practical commercialization of certain phosphor-based technologies such as display screens for large format display systems where large quantities of phosphor materials are needed for large display areas (e.g., greater than 100 inches in dimension).

Phosphor materials based on Ba, Ca and Sr nitrides with the Eu activator are known materials for emitting red light under optical excitation by UV light, including light at or near 405 nm in wavelength. Such red-emitting Ba, Ca and Sr nitride phosphors with the Eu activator can be used with green and blue light to produce desired colors under certain color gamut requirements (e.g., the NTSC/PAL color gamut requirements) for display and other applications. In addition, red-emitting Ba, Ca and Sr nitride phosphors with the Eu activator are known to exhibit good performance in thermal quenching and can operate at elevated temperatures (e.g., at or above 150 to several hundred degrees cesium) while still maintaining sufficient light emission efficiency. In various LED-based lighting devices that generally operate at elevated temperatures, red-emitting Ba, Ca and Sr nitride phosphors with the Eu activator and other nitride phosphors become the red-emitting phosphors of choice.

However, Ba, Ca and Sr nitride phosphors with the Eu activator and other red-emitting nitride phosphors are generally expensive. For example, the prices for red-emitting nitride phosphors are significantly higher than prices of silicate phosphors that emit light in the red-orange spectral range at wavelengths shorter than the emission wavelengths of red-emitting nitride phosphors. Some Ba, Ca and Sr nitride phosphors with the Eu activator are sold at prices that are tens or over 50 times (e.g., 50 times) higher than some silicate phosphors.

Red-emitting phosphors disclosed in this document include composite phosphors that mix red-emitting nitride phosphors and silicate phosphors to emit red light with an emission wavelength at the peak that is shorter than a wavelength of the red-emitting nitride phosphors to increase the perceived brightness of the red emission while maintaining the proper NTSC/PAL color gamut requirements. Such nitride-silicate composite phosphors can reduce the phosphor cost by adding lower cost silicate phosphors and reducing the amounts of the high cost red-emitting nitride phosphors. Because nitride phosphors and silicate phosphors have different absorption spectral profiles in absorbing the excitation light, the compositions of such nitride-silicate composite phosphors can be designed to optimize the optical excitation efficiency at a particular excitation wavelength. In addition, the composition of such a nitride-silicate composite phosphor can be formulated to maintain sufficient performance in thermal quenching for certain LED devices and phosphor display devices that operate phosphors at temperatures lower than some elevated temperatures in some LED devices that require high-temperature thermal quenching performance of expensive red-emitting nitride phosphors.

Figure 18:
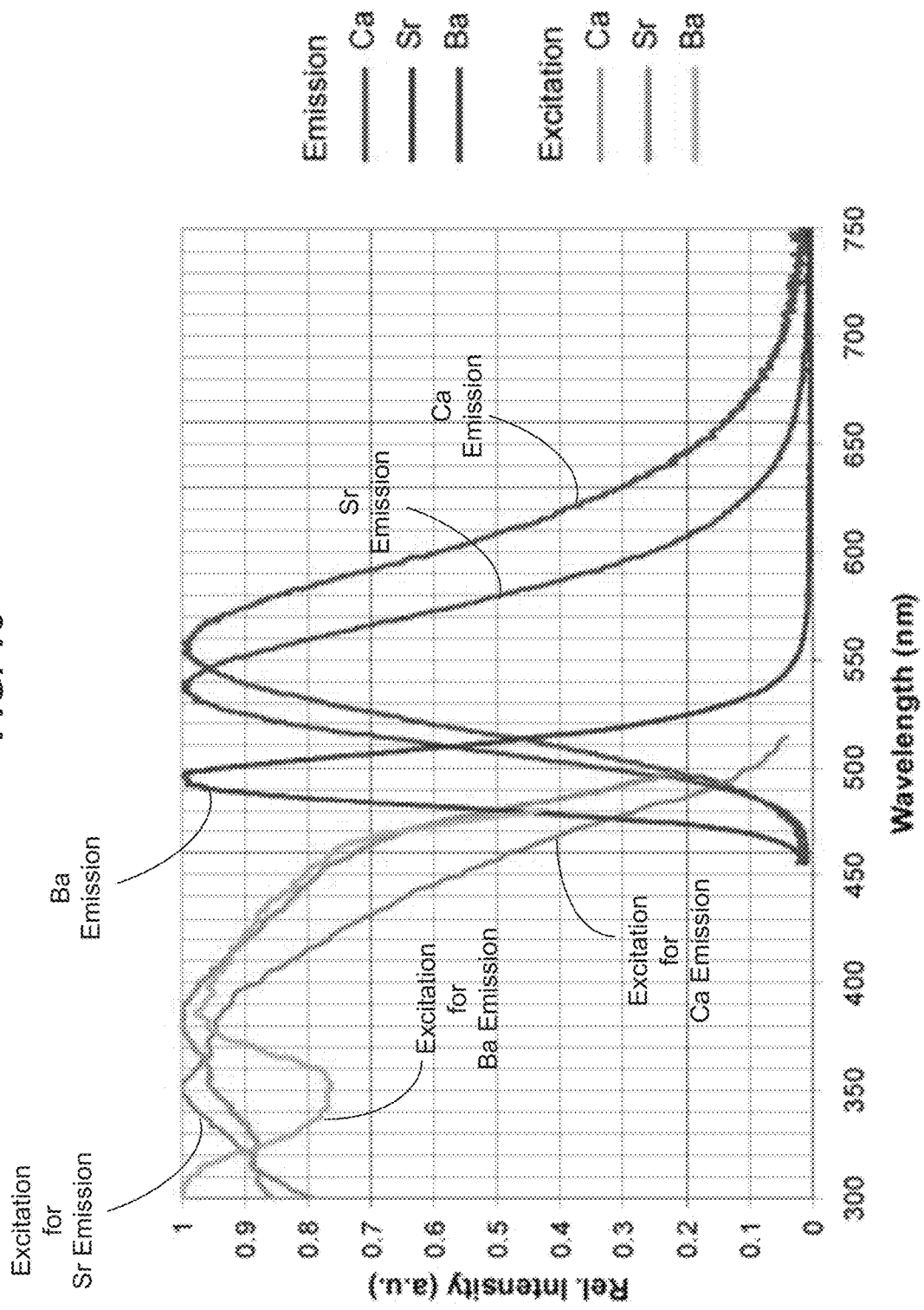
FIGS. 18 and 19 illustrate optical absorption and emission spectra of phosphors with different compositions.

FIG. 18 shows optical absorption and emission spectral profiles of three different nitride phosphor materials with emission peaks at different wavelengths: a Ca nitride phosphor Ca $Si_2O_2N_2$:Eu, a Si nitride phosphor Sr $Si_2O_2N_2$:Eu and a Ba nitride phosphor $BaSi_2O_2N_2$:Eu. Different combinations of transition metal ions Ca, Si and Ba cause different emission wavelengths and spectral profiles. The optical absorption profiles of the three nitride phosphors for absorbing excitation light are also provided in FIG. 18. Hence, different combinations of transition metal ions can be used to generate emission in different colors, e.g., red, green and blue.

Instead of using one phosphor for emission of light at a desired color, a composite phosphor material for a particular color emission includes two or more different phosphor materials (transition metal compounds) that absorb excitation light at a given excitation wavelength to emit visible light at spectrally close but different spectral wavelengths or bands that spectrally overlap to produce a desired color. As indicated in FIG. 18, different phosphor compositions can have different but overlapping optical absorption spectral profiles and this aspect can be used to use the mixture of different phosphors to optimize the efficiency of optical absorption of the excitation light while producing a desired output color by combining the different but overlapping emissions of the different phosphors.

Figure 19:
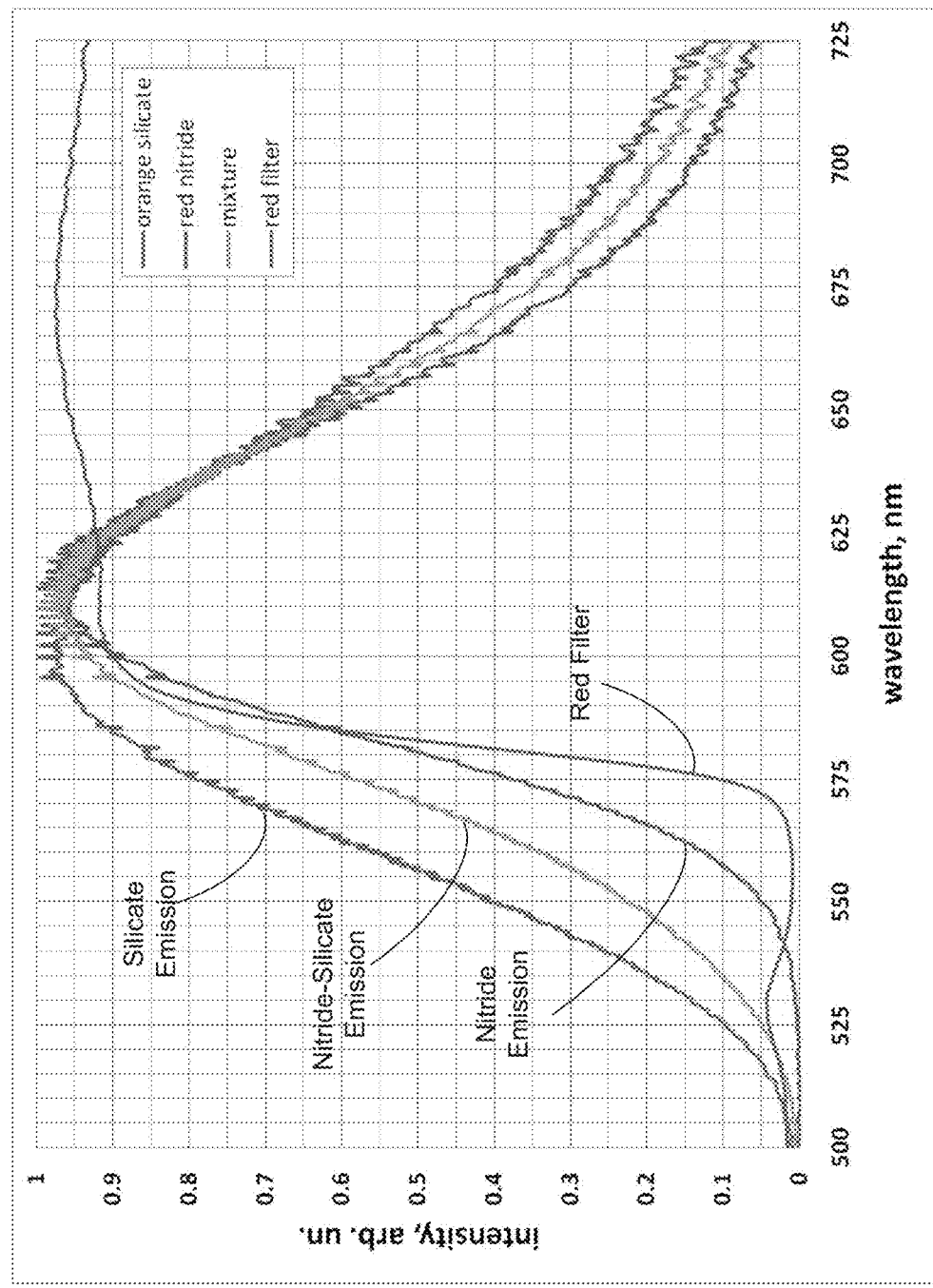

FIG. 19 shows an example of optical emission spectral profiles of a nitride phosphor and a silicate phosphor under a common excitation light of 405 nm. The nitride phosphor is a red-emitting phosphor with an emission peak around 615-630 nm and the silicate phosphor is a near red-emitting phosphor that has its emission peak on the short wavelength side ("orange color" side) around 600-610 nm. A mixture of such silicate and nitride phosphors can be used to produce a red emission profile between those of the two phosphors as illustrated by an example labeled as "Nitride-Silicate Emission" in FIG. 19. The emission peak of this mixture phosphor is between 600 nm and 620 nm. Adding the silicate phosphor shifts the emission from 615-630 mn to the shorter wavelength but the mixture is designed to maintain the shifted emission peak in the red region to comply with the NTSC/PAL color gamut requirements. As such, without significantly compromising the color purity under the NTSC/PAL color gamut requirements, the shift in emission wavelength by adding the silicate phosphor increases the perceived brightness of the emitted red color by human eyes. This shift can be controlled by controlling the composition of the mixture or the ratio between the nitride phosphor and silicate phosphor to place the shifted red emission peak at a particular red wavelength desired for an application, e.g., matching with the fixed blue and green colors to produce the proper color gamuts. Since the amount of the nitride phosphor is reduced in the composite phosphor relative to the pure nitride phosphor, the cost is reduced.

To further augment the red emission profile produced by the composite phosphor in FIG. 19, an additional red color filtering material can be implemented in the composite phosphor to further shape the red emission profile in some implementations. This can be achieved by, in one implementation, using an additional red optical filtering material in the red-emitting composite phosphor to filter the emitted light. In FIG. 19, a spectral transmission of a red filter material is shown to shape the emission profile of the Nitride-Silicate Emission.

Various nitride and silicate phosphors for emitting red or near-red light can be considered to construct red-emitting composite phosphors. Examples of red emitting nitride phosphors include: $(Ba,Sr,Ca)AlSiN_3$:Eu, $(Ca,Sr,Ba)Si_2O_2N_2$:Eu, and $(Ca,Sr,Ba)_2Si_5N_8$:Eu, and $(Ba,Ca,Sr,Eu)_2Si_5N_{8-2x}O_xC_x$, where $0 \le Sr_3N_2 < 0.46$, $0 \le Ba_3N_2 < 0.56$, $0 \le Ca_3N_2 < 0.30$, $0 < Si_3N_4 < 0.7$, $0 < EuO < 0.38$, $0 < SiC \le 0.12$. The materials $Sr_3N_2$, $Ba_3N_2$, $Ca_3N_2$, $Si_3N_4$, EuO and SiC are compounds that are present in the final compound $(Ba,Ca,Sr,Eu)_2Si_5N_{8-2x}O_xC_x$. Examples of near red-emitting silicate phosphors include $(Sr,Ba,Ca)_2SiO_4$:Eu, $(Ba,Mg,Eu,Mn)_4Si_2O_8$, $(Ba,Sr,Ca)_3SiO_5$:Eu, $(Sr, Ba, Ca)_2SiO_4$:Eu in which $0 \le Ba < 0.35$, $0 \le Ca < 0.20$, $0 < Eu < 0.55$, $0.1 \le Sr < 0.65$, $(Ba, Sr, Ca)_3SiO_5$:Eu in which $0 \le Ba < 0.82$, $0 \le Ca < 0.57$, $0 < Eu < 0.84$, $0.1 < Sr < 0.75$, and $(Ba, Mg, Eu, Mn)_4Si_2O_8$, where: $0.3 \le Ba \le 0.80$, $0.02 \le Mg \le 0.1$, $0 < Eu \le 0.25$, $0 < Mn < 0.1$.

Based on these nitride and silicate phosphors, red-emitting composite phosphors can be formed based on specific needs of phosphor applications. In general, a red-emitting composite phosphor can include one or more nitride phosphors and one or more silicate phosphors. For example, the weight percentage of the one or more nitride phosphors can be 90% to 10% of the total weight of the composite phosphor while the weight percentage of the one or more silicate phosphors can be 10% to 90% of the composite phosphor. The relative weight ratio between the one or more silicate phosphors and the one or more nitride phosphors can be 1:1 (equal amounts) or other ratios depending on the needs in specific applications of such composite phosphors. For example, in some examples, the total amount of the one or more silicate phosphors is set to be equal to the total amount of the one or more nitride phosphors (equal amounts) to produce a desired red color for increasing or maximizing the number of possible colors that can be generated when mixing with blue and green colors. Referring back to the example in FIG. 19, the relative ratios between the one or more silicate phosphors and the one or more nitride phosphors can be in part determined by the effective emission wavelength of the composite phosphor. For example, a longer (and thus "darker") wavelength emission in the red zone would require a greater amount of the nitride phosphors (at an increased cost) and a shorter (and thus "brighter") wavelength emission in the red zone would require a greater amount of the silicate phosphors (at a reduced cost).

Various nitride phosphors are known to have good thermal quenching performance and thus are suitable for various LED devices with high brightness under high temperatures. Various silicate phosphors whose thermal quenching performance is less than that of the nitride phosphors are not considered as phosphor candidates for high brightness LED and other devices. For applications that operate phosphors at or near ambient temperatures or slightly elevated temperatures above the ambient, the optical emission efficiency, the emission wavelengths and the cost of the phosphor materials are more important than the thermal quenching performance. For display applications, the improved brightness by replacing a red-emitting nitride phosphor with a red-emitting nitride-silicate composite phosphor without significantly compromising the color purity and color gamut reproduction in the display devices presents a significant improvement in the overall performance of the display system while reducing the cost of the display screens, especially for large format display screens.

For certain applications that require the maximum number of colors that can be reproduced via mixing red, green and blue light emitted by phosphors, a nitride red-emitting phosphor can be used to produce the deep red light without having to blend with an orange-red silicate phosphor. Such applications can be certain scanning beam displays. Among various phosphor combinations, the following examples can be advantageously used based on a pure nitride red phosphor in combination with specific blue and green phosphors to provide high fidelity in producing pure colors, color saturation and hues:

(1) $(Ba,Sr,Ca)AlSiN_3$:Eu (red between 625 nm and 635 nm), $(Sr,Ba,Ca)_2SiO_4$:Eu (green between 525 nm to 530 nm), and $Sr_3MgSi_2O_8$:Eu (blue between 455 nm and 465 nm).

(2) $(Ca,Sr,Ba) Si_2O_2N_2$:Eu (red between 625 nm and 635 nm), $(Sr,Ba,Ca)_2SiO_4$:Eu (green between 525 nm to 530 nm), and $Sr_3MgSi_2O_8$:Eu (blue).

(3) $(Ca,Sr,Ba)_2Si_5N_8$:Eu $(Ba,Ca,Sr,Eu)_2Si_5N_{8-2x}O_xC_x$, where $0 \leq Sr_3N_2 < 0.46$, $0 \leq Ba_3N_2 < 0.56$, $0 \leq Ca_3N_2 < 0.30$, $0 < Si_3N_4 < 0.7$, $0 < EuO < 0.38$, $0 < SiC \leq 0.12$ (red between 625 nm and 635 nm), $(Sr,Ba,Ca)_2SiO_4$:Eu (green between 525 nm to 530 nm), and $Sr_3MgSi_2O_8$:Eu (blue between 455 nm and 465 nm).

While this patent document contains many specifics, these should not be construed as limitations on the scope of an invention or of what may be claimed, but rather as descriptions of features specific to particular embodiments of the invention. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this patent document.

What is claimed is:

1. A display device, comprising:
a display screen comprising a light-emitting layer including different phosphor regions that absorb excitation light to emit visible light of designated colors, respectively, wherein two adjacent phosphor regions emit light of two different colors, each phosphor region includes a phosphor mixture including a light-emitting phosphor material that emits light of a designated color in an emission spectral bandwidth, and one or more color filtering pigments embedded within the light-emitting phosphor material and selected relative to the light-emitting phosphor material to transmit light of a respective designated color of the phosphor region while absorbing light of colors different from the respective designated color to shift a peak wavelength of emitted light in the respective designated color from a peak wavelength of emitted light in the respective designated color from the light-emitting phosphor material alone without the one or more color filtering pigments and to reduce an output spectral bandwidth of the respective designated color produced by the phosphor region to be narrower than the emission spectral bandwidth, each phosphor mixture being formulated to keep phosphor particles dispersed without clumping; and
an optical module operable to produce the excitation light that scans across the display screen and carries optical pulses that carry information of different colors on a colored image to be generated by the emitted visible light of different colors by the display screen.

2. The device as in claim 1, wherein:
each phosphor region includes one or more color filtering pigments embedded in the light-emitting phosphor material where each color filtering pigment exhibits a different optical absorption spectral profile within its phosphor region effectuating an optical transmission spectral profile, where each color filtering pigment has a distinct optical absorption spectral profile so that the output color of the emitted light out of the phosphor region is shifted in wavelength from a color of the emitted light by the light-emitting phosphor material without the one or more embedded color filtering pigments.

3. The device as in claim 2, wherein:
the light-emitting layer includes blue phosphor regions that emit blue light, and one or more color filtering pigments embedded in the light-emitting phosphor material transmit the blue light while absorbing light of other colors and include Pigment Blue 60 or Pigment Blue 15:4.

4. The device as in claim 2, wherein:
the light-emitting layer includes green phosphor regions that emit green light, and two or more color filtering pigments embedded in the light-emitting phosphor material that transmit the green light while absorbing light of other colors and include $(Sr,Ba,Ca)_2SiO_4$:Eu; a composition that includes Sr, Ca, Al, Si, N, Eu and PG36 Lionol Green 6YKP-N, PG7 Heliogen Green D 8730, PG7 Sunfast Green 7 264-8735, PB15:4 in combination with PY128, PB15:4 in combination with PY150.

5. The device as in claim 2, wherein:
the light-emitting layer includes red phosphor regions that emit red light, and two or more color filtering pigments embedded in the light-emitting phosphor material transmit the red light while absorbing light of other colors and include $(Ba,Ca,Sr, Eu)_2Si_5N_{8-2x}O_xC_x$ (x is a positive integer); a composition that includes Sr, Al, N, Eu and PV19 red shade RJA dispersion, PV55 RJA dispersion, PR254 Irgaphor Red 3612 CF, PR264 Irgazin Rubine L 4030 NA.

6. The device as in claim 1, wherein:
each phosphor region includes two or more color filtering pigments embedded in the light-emitting phosphor material where different color filtering pigments exhibit different optical transmission spectral profiles for two different colors to effectuate a combined optical transmission spectral profile that is for a respective designated color of the phosphor region and has the output spectral bandwidth narrower than the emission spectral bandwidth of the light-emitting phosphor material.

7. The device as in claim 6, wherein:
the light-emitting layer includes green phosphor regions that emit green light, and two or more color filtering pigments embedded in the light-emitting phosphor material in each green phosphor region includes (1) a combination of PB15:4 that transmits blue light and PY128 that transmits yellow light, (2) a combination of PB15:4 that transmits blue light and PY150 that transmits yellow light, or (3) a first color filtering pigment containing PY128 to transmit a yellow light and a second color filtering pigment containing Heliogen Green D 8730, PG36, or Sunfast G7 2648735 to transmit green light.

8. The device as in claim 6, wherein:
the light-emitting layer includes blue phosphor regions that emit blue light, and two or more color filtering pigments embedded in the light-emitting phosphor material in each blue phosphor region includes a first color filtering pigment containing PB60 RJA D3410-B60 to transmit a blue light and a second color filtering pigment containing PB15:6 RJA D3410C-15:6 to transmit blue light.

9. The device as in claim 6, wherein:
the light-emitting layer includes red phosphor regions that emit red light, and two or more color filtering pigments embedded in the light-emitting phosphor material in each red phosphor region includes a first color filtering pigment containing PV55 RJA dispersion to transmit a red light and a second color filtering pigment containing PV19 red shade RJA dispersion to transmit red light.

10. The device as in claim 1, wherein the one or more color filtering pigments embedded in the light-emitting phosphor material in a phosphor region that emits red light include PV19, PV55, PR254 or PR264.

11. The device as in claim 1, wherein the one or more color filtering pigments embedded in the light-emitting phosphor material in a phosphor region that emits red light include a quinacridone or diketopyrrolopyrrole.

12. The device as in claim 1, wherein the one or more color filtering pigments embedded in the light-emitting phosphor material in a phosphor region that emits green light include PG36, PG7, a combination of PB15:4 and PY128, or a combination of PB15:4 and PY150.

13. The device as in claim 1, wherein the one or more color filtering pigments embedded in the light-emitting phosphor material in a phosphor region that emits green light include copper bromochlorophthalocyanine, a copper perchlororphthalocyanine, a combination of copper phthalocyanine and an azo, or a combination of copper phthalocyanine and a nickel azomethine.

14. The device as in claim 1, wherein the one or more color filtering pigments embedded in the light-emitting phosphor material in a phosphor region that emits blue light include PB60 or PB15:6.

15. The device as in claim 1, wherein the one or more color filtering pigments embedded in the light-emitting phosphor material in a phosphor region that emits blue light include indanthrone or copper phthalocyanine.

16. The device as in claim 1, wherein a light-emitting phosphor material that emits blue light in a phosphor region of the display screen includes a blue phosphor $Sr_3MgSi_2O_8$:Eu.

17. The device as in claim 16, wherein the one or more color filtering pigments embedded in the light-emitting phosphor material in a phosphor region that emits blue light include indanthrone or copper phthalocyanine.

18. The device as in claim 1, wherein a light-emitting phosphor material that emits green in a phosphor region of the display screen includes a green phosphor including $(Sr,Ba,Ca)_2SiO_4$:Eu and a composition that includes Sr, Ca, Al, Si, Ni and Eu.

19. The device as in claim 18, wherein the one or more color filtering pigments embedded in the light-emitting phosphor material in a phosphor region that emits green light include copper bromochlorophthalocyanine, a copper perchlororphthalocyanine, a combination of copper phthalocyanine and an azo, or a combination of copper phthalocyanine and a nickel azomethine.

20. The device as in claim 1, wherein a light-emitting phosphor material that emits red in a phosphor region of the display screen includes a red phosphor including $(Ba,Ca,Sr,Eu)_2Si_5N_{8-2x}O_xC_x$ (0<x<12) or a composition that includes Si, Ni and Eu.

21. The device as in claim 20, wherein the one or more color filtering pigments embedded in the light-emitting phosphor material in a phosphor region that emits red light include a quinacridone or diketopyrrolopyrrole.

22. The device as in claim 1, wherein:
the one or more color filtering pigments embedded in the light-emitting phosphor material absorb the excitation light and have a total weight less than 2 percent of a total weight of the phosphor mixture.

23. The device as in claim 1, wherein:
each color filtering pigment embedded in the light-emitting phosphor material has a total weight less than 1 percent of a total weight of the phosphor mixture.

24. The device as in claim 1, wherein:
the optical module is configured to produce the excitation light at an optical wavelength between 405 nm and 415 nm.

25. The device as in claim 1, wherein:
the optical module is structured to include multiple light sources that produce multiple scanning beams of the excitation light that scan across the display screen, each scanning beam carrying optical pulses that carry information of different colors of a colored image to be generated by the emitted visible light of different colors.

26. The device as in claim 25, wherein the optical module includes:
an array of diode lasers that produce the multiple scanning beams of the excitation light, respectively;
a signal modulation controller coupled to the diode lasers to provide modulated driving currents to the diode lasers, respectively with one driving current per one diode laser, to directly modulate each driving current to cause modulation of each laser beam carrying optical pulses that carry information of different colors; and
a laser scanning module that receives the laser beams and scan the received laser beams as scanning beams onto the display screen.

27. The device as in claim 1, wherein:
the display screen includes a first layer on a first side of the light-emitting layer operable to transmit the excitation light and to reflect the visible light, wherein the first layer comprises a composite sheet of a plurality of dielectric layers that are coextruded to have alternating high and low refractive indices to form an optical interference filter.

28. The device as in claim 1, comprising:
an optical sensing unit positioned to receive a portion of light from the screen that is different in wavelength from the excitation light of the scanning beams from the optical module and operable to produce a monitor signal indicating a spatial alignment of each scanning beam on the screen; and
a feedback control mechanism operable to receive the monitor signal and to control the optical module to adjust a timing of the optical pulses carried by each scanning beam in response to the monitor signal to correct a spatial alignment error of the scanning beam on the display screen indicated by the monitor signal.

29. The device as in claim 1, wherein:
the light-emitting layer is patterned into parallel stripes, and wherein two adjacent stripes emit light at two different visible wavelengths of two different colors.

30. The device as in claim 1, wherein:
each phosphor includes a dispersing additive that keeps phosphor particles from clumping.

31. The device as in claim 30, wherein:
the dispersing additive includes Disperbyk-111, 167, or 168, Tego Disper 655 or 685, or K-Sperse A503.

32. A method for using light-emitting phosphor materials to produce colors to meet color gamut under the Digital Cinema Initiatives (DCI) in a phosphor display screen that is optically excited by UV light between 405 nm and 415 nm, comprising:
including in a display screen a light-emitting layer that includes different phosphor regions that absorb excitation light to emit visible light of red, green and blue colors, respectively;
configuring each phosphor region to include a phosphor mixture with a selected light-emitting phosphor material that emits light of a designated color of red, green or blue in an emission spectral bandwidth of the selected light-emitting phosphor material;
further embedding one or more color filtering pigments within the selected light-emitting phosphor material, while keeping phosphor particles dispersed without clumping, to transmit light of a respective designated color of the phosphor region while absorbing light of colors different from the respective designated color; and
selecting the one or more color filtering pigments in each light-emitting phosphor material to (1) reduce an output spectral bandwidth of the respective designated color produced by the phosphor region to be narrower than the emission spectral bandwidth and (2) to cause a shift in a peak wavelength of emitted light in the respective designated color from a peak wavelength of emitted light in the respective designated color from the light-emitting phosphor material alone without the one or more color filtering pigments.

33. The method as in claim 32, wherein the one or more color filtering pigments embedded in the light-emitting phosphor material in a phosphor region that emits red light include PV19, PV55, PR254 or PR264.

34. The method as in claim 32, wherein the one or more color filtering pigments embedded in the light-emitting phosphor material in a phosphor region that emits red light include a quinacridone or diketopyrrolopyrrole.

35. The method as in claim 32, wherein the one or more color filtering pigments embedded in the light-emitting phosphor material in a phosphor region that emits green light include PG36, PG7, a combination of PB15:4 and PY128, a combination of PB15:4 and PY150, a combination of PB15:4 and PY129, or a combination of PB15:4 and PY110.

36. The method as in claim 32, wherein the one or more color filtering pigments embedded in the light-emitting phosphor material in a phosphor region that emits green light include copper bromochlorophthalocyanine, a copper perchlororphthalocyanine, a combination of copper phthalocyanine and an azo, or a combination of copper phthalocyanine and a nickel azomethine.

37. The method as in claim 32, wherein the one or more color filtering pigments embedded in the light-emitting phosphor material in a phosphor region that emits blue light include PB60 or PB15:6.

38. The method as in claim 32, wherein the one or more color filtering pigments embedded in the light-emitting phosphor material in a phosphor region that emits blue light include indanthrone or copper phthalocyanine.

39. The method as in claim 32, wherein a light-emitting phosphor material that emits blue light in a phosphor region of the display screen includes a blue phosphor $Sr_3MgSi_2O_8$:Eu.

40. The method as in claim 39, wherein the one or more color filtering pigments embedded in the light-emitting phosphor material in a phosphor region that emits blue light include indanthrone or copper phthalocyanine.

41. The method as in claim 32, wherein a light-emitting phosphor material that emits green in a phosphor region of the display screen includes a green phosphor including $(Sr,Ba,Ca)_2SiO_4$:Eu and a composition that includes Sr, Ca, Al, Si, Ni and Eu.

42. The method as in claim 41, wherein the one or more color filtering pigments embedded in the light-emitting phosphor material in a phosphor region that emits green light include copper bromochlorophthalocyanine, a copper perchlororphthalocyanine, a combination of copper phthalocyanine and an azo, or a combination of copper phthalocyanine and a nickel azomethine.

43. The method as in claim 42, wherein a light-emitting phosphor material that emits red in a phosphor region of the display screen includes a red phosphor including $(Ba,Ca,Sr,Eu)_2Si_5N_{8-2x}O_xC_x$ (x is a positive integer) or $Si_{3-6}Al_{0.01-3}N_{5-8}$:$Eu_{0.001-0.1}$.

44. The method as in claim 43, wherein the one or more color filtering pigments embedded in the light-emitting phosphor material in a phosphor region that emits red light include a quinacridone or diketopyrrolopyrrole.

45. The method as in claim 32, wherein:
the one or more color filtering pigments embedded in the light-emitting phosphor material absorb the excitation light and have a total weight less than 2 percent of a total weight of the phosphor mixture to prevent reduction of an amount of the excitation light that reaches the light-emitting phosphor material.

46. The method as in claim 32, comprising:
controlling each color filtering pigment embedded in the light-emitting phosphor material to have a total weight less than 1 percent of a total weight of the phosphor mixture to prevent reduction of an amount of the excitation light that reaches the light-emitting phosphor material.

47. The method as in claim 32, further comprising:
selecting, in each phosphor region, the one or more color filtering pigments embedded in the light-emitting phosphor material where each color filtering pigment exhibits a different optical absorption spectral profile within its phosphor region effectuating an optical transmission spectral profile and each color filtering pigment has a distinct optical absorption spectral profile to shift the output color of the emitted light out of the phosphor region in wavelength from a color of the emitted light by the light-emitting phosphor material without the one or more embedded color filtering pigments.

48. The method as in claim 32, wherein:
each phosphor includes a dispersing additive that keeps phosphor particles from clumping.

49. The method as in claim 48, wherein:
the dispersing additive includes Disperbyk-111, 167, or 168, Tego Disper 655 or 685, or K-Sperse A503.

* * * * *